(12) United States Patent
Kindaichi

(10) Patent No.: US 6,434,332 B1
(45) Date of Patent: Aug. 13, 2002

(54) DISTANCE-MEASURING DEVICE, DISTANCE-MEASURING METHOD AND CAMERA USING THE SAME

(75) Inventor: Takeshi Kindaichi, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/563,727

(22) Filed: May 3, 2000

(30) Foreign Application Priority Data

May 20, 1999 (JP) .......................................... 11-139679

(51) Int. Cl.[7] .............................................. G03B 15/00
(52) U.S. Cl. .................... 396/123; 396/121; 250/559.38
(58) Field of Search ........................ 250/208.1, 559.38, 250/201.4, 201.2; 356/4.07; 396/121, 106, 80, 123, 122, 95, 104, 98

(56) References Cited

U.S. PATENT DOCUMENTS 4,734,571 A    3/1988  Hamada et al.
6,308,014 B1 * 10/2001  Nonaka et al. ............. 396/106

FOREIGN PATENT DOCUMENTS

| JP | 62-103615 | 5/1987 |
| JP | 63-131019 | 6/1988 |
| JP | 2-158705 | 6/1990 |
| JP | 10-336921 | 12/1998 |

* cited by examiner

Primary Examiner—Robert H. Kim
Assistant Examiner—Hoon K. Song
(74) Attorney, Agent, or Firm—Frishauf, Holtz, Goodman & Chick, P.C.

(57) ABSTRACT

The present invention comprises a first distance-measuring mode in which a subject distance is measured on the basis of a subject image signal produced by at least a pair of light-receiving elements receiving the light from subjects, a second distance-measuring mode in which the subject distance is measured on the basis of an image signal from which a steady-state light removing section has removed the steady-state light component from the subject image signal, while a projecting source is projecting light onto the subjects, and a CPU which causes the second distance-measuring mode to operate for a specific time and, according to the image signal obtained, selects a subject whose distance is to be measured.

14 Claims, 22 Drawing Sheets

DISTANCE-MEASURING AREA

Pmin

DISTANCE-MEASURING AREA

DISTANCE-MEASURING AREA

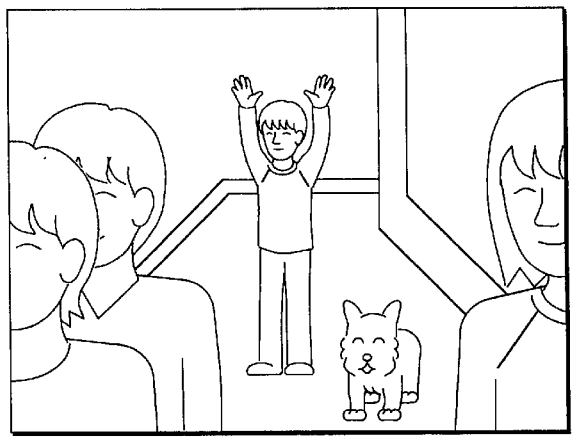
FIG. 11
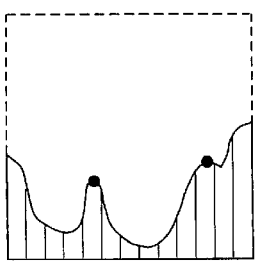 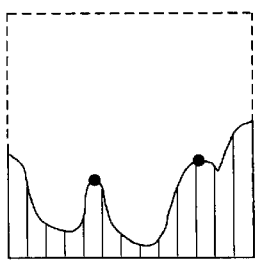
FIG. 12A          FIG. 12B
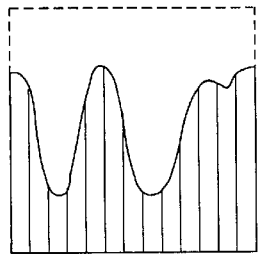 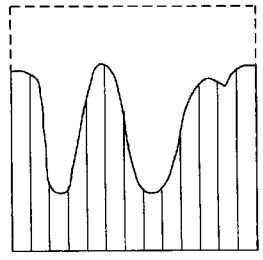
NORMAL MODE (USING CORRECTION FUNCTION)      SPOT MODE      NORMAL MODE (USING CORRECTION FUNCTION)      SPOT MODE      THIS IS NOT SET WHEN CORRECTION FUNCTION
FIG. 12C          FIG. 12D

DISTANCE-MEASURING AREA

| MAXIMAL VALUE | $P_{min} \sim P_1$ | $P_1 \sim P_2$ | $P_2 \sim P_3$ | ... | $P_{n-1} \sim P_{max}$ |
|---|---|---|---|---|---|
| NUMBER OF SENSORS | $S_1$ | $S_2$ | $S_3$ | ... | $S_n$ |

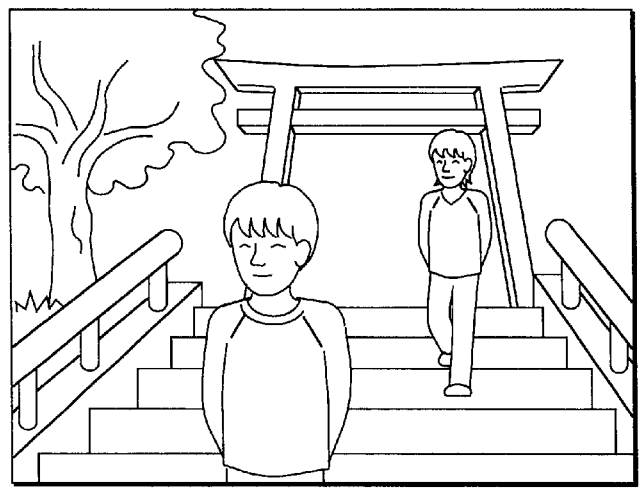
FIG. 21
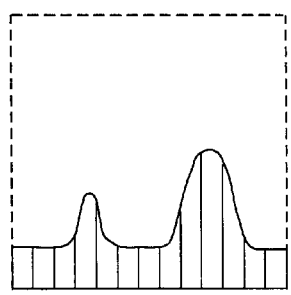 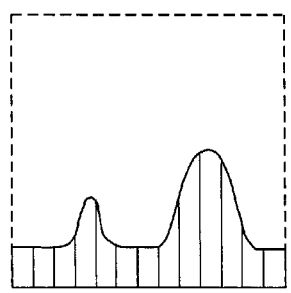
FIG. 22A    FIG. 22B
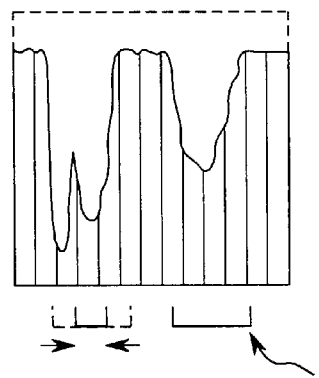 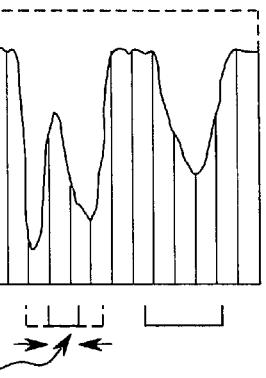
DISTANCE-MEASURING AREA
FIG. 22C    FIG. 22D

DISTANCE-MEASURING DEVICE, DISTANCE-MEASURING METHOD AND CAMERA USING THE SAME

CROSS-REFERENCE TO RELATED APPLICATIONS

This application is based upon and claims the benefit of priority from the prior Japanese Patent Application No. 11-139679, filed May 20, 1999, the entire contents of which are incorporated herein by reference.

BACKGROUND OF THE INVENTION

This invention relates to a distance-measuring device used in an image pickup device, such as a camera for using a silver-salt film, a digital camera, or a video camera, and more particularly to a distance-measuring device for measuring subject distances at points on the shooting screen (so-called multi-autofocus, hereinafter referred to as multi-AF), characterized by a wide distance-measuring area, such as full-screen AF.

Today, it is becoming quite common for image pickup devices, such as cameras, to implement multi-AF. Cameras equipped with a distance-measuring device for measuring subject distances at three, five, or seven points on the shooting screen are commercially available in low-price models.

The multi-AF is one-dimensional multi-AF where distance-measuring areas are arranged on a straight line. Recently, there have been signs of the commercialization of two-dimensional multi-AF or area AF.

For example, a camera equipped with a distance-measuring device having an area AF function using as many as 45 distance-measuring areas 17 on the finder view 16 has been commercialized and put on the market.

In such conventional multi-AF, complex calculations, such as distance-measuring calculations, must be repeated as many times as the number of distance-measuring areas increases. To improve the time-lag, various inventions have been disclosed.

For example, Jpn. Pat. Appln. KOKAI Publication No. 2-158705 has disclosed the technique for acquiring pieces of subject distance information in a first distance-measuring mode in which the distances to points on the subjects are measured roughly, selecting the subject presenting the shortest distance, and measuring the distance only to the selected subject with high accuracy in a second distance-measuring mode, thereby improving the time-lag.

Furthermore, Jpn. Pat. Appln. KOKAI Publication No. 63-131019 has disclosed a technique which is based on the assumption that, in active AF, the closest main subject is present at the place where the amount of light reflected from the projected light is the greatest and which omits distance-measuring calculations for parts where the amount of reflected light is small, thereby improving the time-lag.

Since all the conventional AF methods have used active AF, they have improved the time-lag remarkably. When they attempt to perform full-screen AF or the like, however, a set of projecting elements and a set of light-receiving elements cannot avoid becoming very large, which is an obstacle to putting the device to practical use.

In contrast, passive AF would miniaturize the light-receiving elements much more than active AF, causing no obstacle to putting the device to practical use. Thus, passive AF is more suitable for wide-range multi-AF, such as full-screen AF, than active AF.

In this connection, Jpn. Pat. Appln. KOKAI Publication No. 62-103615 has disclosed the technique for performing rough correlation operation on distance-measuring areas, selecting one of the distance-measuring areas on the basis of the result of the operation, and then performing high-accuracy correlation operation on only the selected distance-measuring area, thereby improving the time lag by passive AF.

The rough correlation operation is performed by thinning out sensor data items, such as using every other sensor data item in calculations, but can never be omitted. Thus, although active AF has a higher efficiency of time-lag measures than passive AF, both types of AF produce the same effect.

A recently proposed solution to the problem of which of passive AF and active AF is more suitable for wide-range multi-AF, such as full-screen AF, is a distance-measuring method using hybrid AF. In hybrid AF, which is now in use, a steady-state light removing circuit for removing steady-state light is provided for each light-receiving element in a passive sensor. A passive operation is performed, when the steady-state light removing function is disabled, whereas an active operation is performed when the steady-state light removing function is enabled. Jpn. Pat. Appln. KOKAI Publication No. 10-336921 has disclosed such a steady-state light removing circuit. Products using hybrid AF are already available on the market.

To perform wide-range multi-AF, such as full-screen AF, time-lag measures are essential. For this reason, various devices have been thought out to avoid using high-speed, expensive CPUs and microcomputers at the sacrifice of cost. One of principal devices divides the process of measuring the distance in two: the first half of the process for pre-distance measurement and the second half of the process for actual distance measurement.

The purpose of the pre-distance measurement is to measure the distance roughly in a short time and estimate the position of the main subject, whereas the purpose of the actual distance measurement is to limit time-consuming high-accuracy distance measurement to the necessary-minimum subjects on the basis of the result of the pre-distance measurement in the preceding process. Although the process of short-time pre-distance measurement increases, the time required to measure the distances to the subjects excluded is eliminated, which helps shorten the entire distance-measuring time.

More specifically, in one type of pre-distance measurement, light is projected onto subjects and the position of the main subject is estimated on the basis of the amount of reflected light. It is common practice to set a subject with a value equal or close to the largest amount of reflected light as a candidate for the main subject.

In the estimating method, however, there can be too many candidates for the main subject, depending on the type of subjects. This can make the measures against time-lag insufficient, which is a drawback in the prior art and therefore a problem to be solved.

BRIEF SUMMARY OF THE INVENTION

It is, accordingly, an object of the present invention to provide not only a high-accuracy, low-cost distance-measuring device and a high-accuracy distance-measuring method which enable only the subject distances at the necessary minimum positions to be measured, regardless of the type of subjects, have less time-lag, enable faster operation, and assure a high reliability of the result of distance measurement, but also a camera using the device and method.

According to a first aspect of the present invention, there is provided a camera comprising: first distance-measuring means for measuring a subject distance on the basis of a subject image signal produced by a pair of integration-type light-receiving sensors receiving the light from subjects; second distance-measuring means for measuring the subject distance on the basis of an image signal from which steady-state light removing means has removed the steady-state light component from the subject image signal, while projecting means is projecting light onto the subjects; subject select means for causing the second distance-measuring means to operate for a specific time and, according to the image signal obtained from that operation, selecting a subject whose distance is to be measured; mode setting means for setting the operation mode of the camera; and upper limit setting means for setting an upper limit on the number of subjects the subject select means selects according to the operation mode set by the mode setting means.

According to a second aspect of the present invention, there is provided a distance-measuring device for a camera comprising: a projecting device for projecting light onto subjects; a light-receiving sensor for receiving the light from the subjects; a distance-measuring area setting circuit which operates the projecting device and sets a distance-measuring area according to the output of the light-receiving sensor; a mode setting circuit capable of setting more than one shooting mode; and a control circuit for controlling the number of distance-measuring areas set at the distance-measuring area setting circuit according to the shooting mode set at the mode setting circuit.

According a third aspect of the present invention, there is provided a distance-measuring method for a camera comprising: a first step of measuring a subject distance on the basis of a subject image signal produced by receiving the light from subjects; a second step of measuring the subject distance on the basis of an image signal obtained by removing the steady-state light component from the subject image signal, while projecting light onto the subjects; a third step of causing the second step to operate for a specific time and, according to the image signal obtained from that operation, selecting a subject whose distance is to be measured; a fourth step of setting the operation mode of the camera; and a fifth step of setting an upper limit on the number of subjects selected at the third step according to the set operation mode.

According to a fourth aspect of the present invention, there is provided a distance-measuring method for a camera comprising: a first step of projecting light onto subjects; a second step of receiving the light from the subjects; a third step of setting a distance-measuring area according to the output by the reception of light; a fourth step of setting more than one shooting mode; and a fifth step of controlling the number of distance-measuring areas set at the third step according to the shooting mode set at the fourth step.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 11 shows an example of a photographic scene;

FIG. 12A shows the sensor data produced by the light-receiving element 4a corresponding to the photographic scene of FIG. 11, FIG. 12B shows the sensor data produced by the light-receiving element 4b corresponding to the photographic scene of FIG. 11, FIG. 12C shows the distance-measuring area corresponding to FIG. 12A, and FIG. 12D shows the distance-measuring area corresponding to FIG. 12B;

FIG. 21 shows an example of a photographic scene;

FIG. 22A shows the sensor data produced by the light-receiving element 4a corresponding to the photographic scene of FIG. 21, FIG. 22B shows the sensor data produced by the light-receiving element 4b corresponding to the photographic scene of FIG. 21, FIG. 22C shows the distance-measuring area corresponding to FIG. 22A, and FIG. 22D shows the distance-measuring area corresponding to FIG. 22B;

DETAILED DESCRIPTION OF THE INVENTION

Hereinafter, referring to the accompanying drawings, an embodiment of the present invention will be explained.

A distance-measuring device according to the present invention is characterized by setting an upper limit on the number of set distance-measuring areas according to the mode. A detailed explanation of the distance-measuring device will be given hereinafter.

Figure 1:
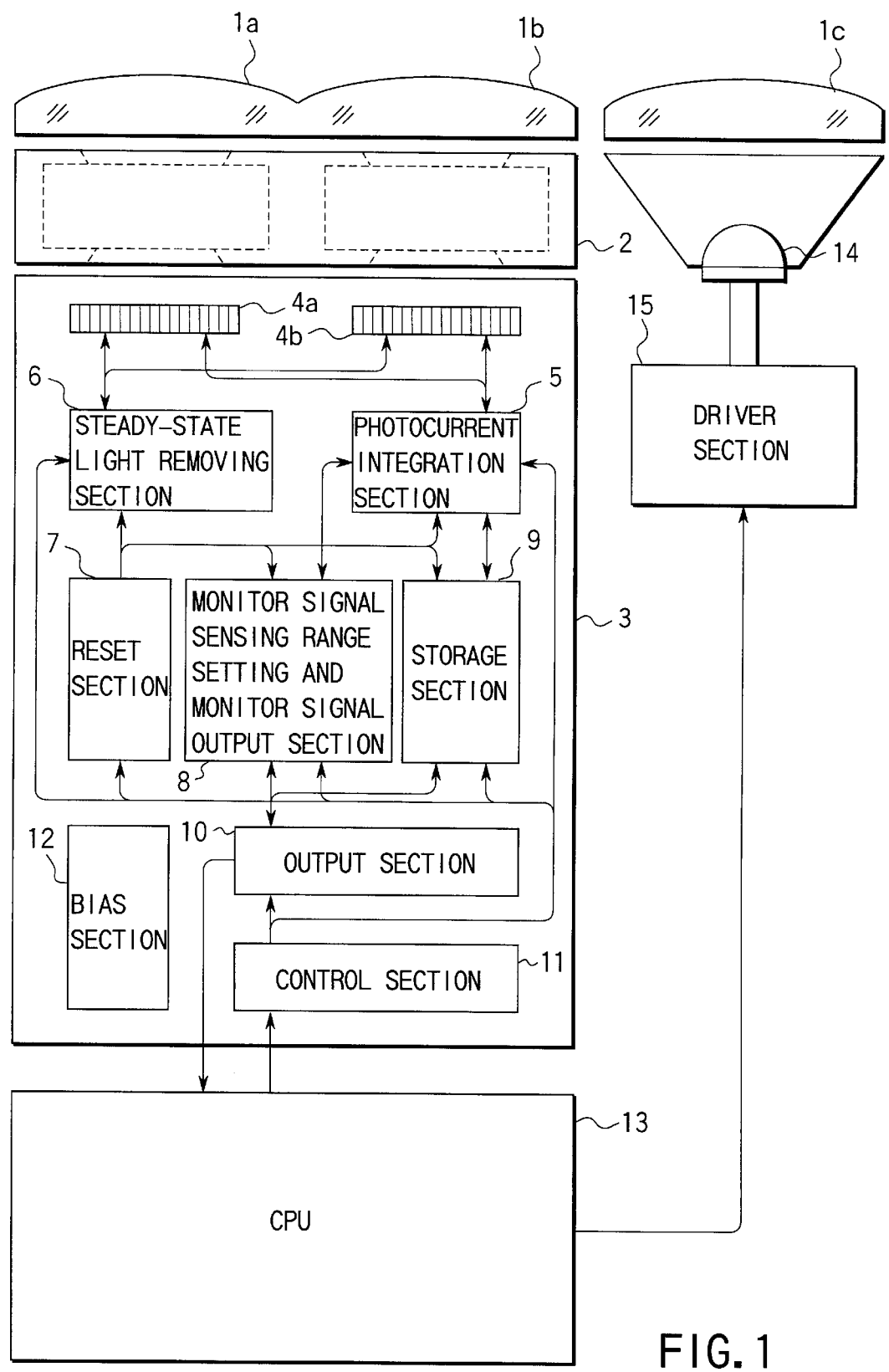
FIG. 1 shows the configuration of a distance-measuring device according to an embodiment of the present invention.

FIG. 1 shows the configuration of a distance-measuring device according to an embodiment of the present invention.

In FIG. 1, light-receiving lenses 1a and 1b for gathering the subject light and the reflected light from the subject struck by supplementary light are provided in a specific position of the distance-measuring device.

There is further provided a housing 2 for securing and dividing optical paths for the light-receiving lenses 1a, 1b and preventing unnecessary light from entering the optical paths. To accomplish those purposes, the housing 2 is made of a material which is dark, normally black, and has superior shading characteristics.

It goes without saying that, to prevent irregular reflection, inclined lines may be formed on the inside of the housing 2 or embossing may be accomplished on the inside of housing 2.

In FIG. 1, numeral 3 indicates an autofocus integrated circuit (hereinafter, referred to as AFIC). Hereinafter, the configuration of the AFIC 3 will be explained in detail.

Inside the AFIC 3, sets of light-receiving elements 4a and 4b for receiving the light gathered by the light-receiving lenses 1a, 1b and converting it photoelectrically are provided. There is further provided a photocurrent integration section 5 for integrating the photocurrent photoelectrically converted by each of the light-receiving elements 4a, 4b.

In addition, there is provided a steady-state light removing section 6 for storing and removing the steady-state one of the photocurrents photoelectrically converted by each of the light-receiving elements 4a, 4b. A reset section 7 for resetting each section in the AFIC 3 is provided.

In FIG. 1, numeral 8 indicates a monitor signal sensing range setting and monitor signal output section which sets an area in the photocurrent integration section 5, senses the maximum integrated amount of photocurrent in the set area, sample-holds the maximum integrated amount temporarily, and outputs a monitor signal for controlling the integration of photocurrent.

The AFIC 3 further includes a storage section 9 for storing integrated amounts, the results of integration at the photocurrent integration section 5, and an output section 10 for outputting the contents of the monitor signal sensing range setting and monitor signal output section 8 and the contents of the storage section 9 to the outside world.

The output section 10 may, of course, include amplification means for amplifying the signal. A control section 11 does the job of controlling the inside of the AFIC 3 on the basis of an externally supplied control signal. A bias section 12 including a voltage source and a current source supplies electric power to various sections.

There are also provided a projecting source 14 for projecting light onto subjects and a project lens 1c for gathering the projected light from the projecting source 14.

The projecting source 14 is controlled by a driver section 15.

In FIG. 1, numeral 13 indicates a central processing unit (hereinafter, referred to as a CPU). The CPU 13 corresponds to the core part of the distance-measuring device of the embodiment and controls each of the above sections. In addition to controlling the distance-measuring device, the CPU 13, of course, controls other various operations of the camera. When the function of the CPU 13 is limited to what is related to the distance-measuring device, the main jobs of the CPU 13 are to acquire information on a subject and calculate the distance to the subject. The functions of acquiring information on the subject and calculating the distance to the subject do not necessarily belong to the CPU 13 and may, of course, be incorporated into the AFIC 3.

In addition to the configuration described above, although not shown in FIG. 1, an EEPROM, a nonvolatile memory, for storing the data necessary for distance measuring, such as adjustment data, may be incorporated.

Hereinafter, referring to the flowchart of FIG. 2, the operation of the distance-measuring device according to the embodiment with the configuration of FIG. 1 will be explained in detail. In the explanation below, the configuration of FIG. 1 will be referred to, using the same reference symbols.

First, the CPU 13 effects the initial setting of the distance-measuring device (step Si).

Specifically, the CPU 13 itself performs a preparatory operation to start distance measurement. After the preparation, the CPU 13 starts distance measurement. After the CPU 13 has sent a control signal to the control section 11, the control section 11 actuates the reset section 7. As a result of the actuation, the reset section 7 resets each of the photocurrent integration section 5, steady-state light removing section 6, monitor signal sensing range setting and monitor signal output section 8, and storage section 9.

Then, the CPU 13 executes pre-integration (step S2).

Specifically, the CPU 13 sends a signal for operating the steady-state light removing section 6 and a signal for setting a monitor signal setting range to the control section 11. Receiving the signal, the control section 11 enables the steady-state light removing section 6 and further sets a monitor signal sensing range. Next, the CPU 13 sends a signal for causing the projecting source 14 to emit light to the driver section 15, which then causes the projecting source 14 to emit light. Following that, the CPU 13 outputs a signal for starting photocurrent integration to the control section 11. Receiving the signal, the control section 11 causes the photocurrent integration section 5 to start photocurrent integration. After having executed a specific operation, the CPU 13 ends the integration of the photocurrent. The pre-integration is carried out in the active mode.

Next, the CPU 13 senses the maximum integrated amount and its position on the sensor (step S3).

Specifically, after the integration, the CPU 13 stores all the integrated amounts for the individual photoelectric conversion elements integrated at the photocurrent integration section 5 into the storage section 9. The integrated amounts stored in the storage section 9 are image signals formed by the reflection from the subject of the light emitted from the projecting source 14. The CPU 13 obtains the image signal via the output section 10. When obtaining the image signal, the CPU 13 senses the maximum value and the position of the maximum value on the sensor.

Thereafter, the CPU 13 compares the maximum value sensed at step S3 with a specific value (step S4). When the maximum value is larger than the specific value, the CPU 13 judges that the main subject has reflected the light emitted from the projecting source 14, and passes control to step S5. When the maximum value is smaller than the specific value, the CPU 15 judges that the position of the main subject is impossible to estimate, because the main subject is so far away that the light emitted from the projecting source 14 cannot reach the main subject or the reflectivity of the main subject is extremely low. Then, the CPU 15 passes control to step S6.

Figure 3:
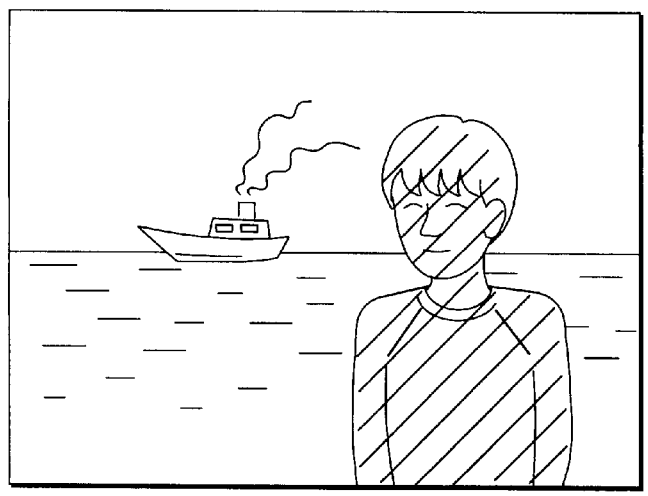
FIG. 3 shows an example of a photographic scene.
Figures 4A, 4B:
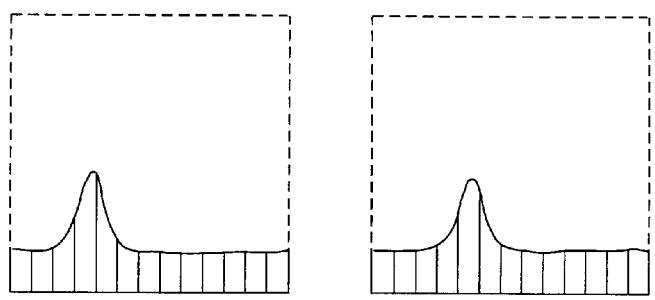
FIG. 4A shows the sensor data produced by a light/receiving element 4a corresponding to the photographic scene of FIG. 3.
FIG. 4B shows the sensor data produced by a light-receiving element 4b corresponding to the photographic scene of FIG. 3.
Figures 4C, 4D:
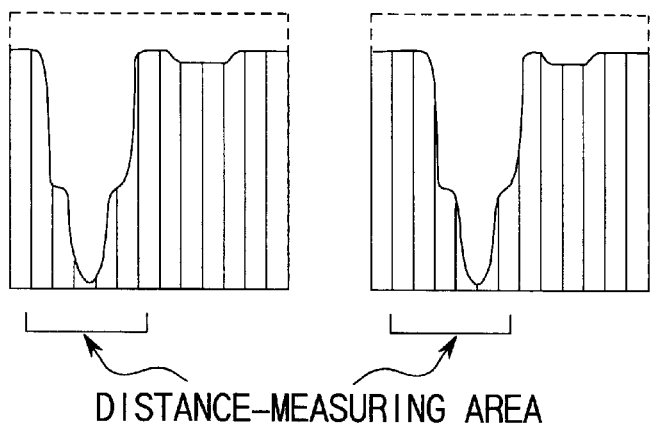
FIG. 4C shows the distance-measuring area corresponding to FIG. 4A.
FIG. 4D shows the distance-measuring area corresponding to FIG. 4B.

At step S5, the CPU 13 sets a distance-measuring area in a specific area centering on and around the point of the maximum integrated amount. Specifically, in the scene of FIG. 3, sensor data is obtained through pre-integration (see FIGS. 4A and 4B), a distance-measuring area is set on the basis of the pre-integration (see FIGS. 4C and 4D), and the subject distance is calculated using the result of the final integration and the set distance-measuring area. The distance-measuring area may be sensed or set.

At step S6, the CPU 13 sets the distance-measuring area in a prepared specific area (default position). For example, in the scene of FIG. 5, the position of the required subject cannot be estimated through pre-integration (see FIGS. 6A and 6B). At this time, the distance-measuring area has only to be set in the default position. Specifically, as shown in FIGS. 6C and 6D, the distance-measuring areas may be overlapped with each other. Of course, they may be set separately without overlap.

Then, the CPU 13 does final integration (step S7).

Specifically, the CPU 13 actuates the reset section 7 in the AFIC 3, thereby resetting each means in the AFIC 3. In the final integration, the steady-state light removing section 6 is disabled. Then, the CPU 13 sets the monitor signal sensing range and provides on/off control of the emission of the projecting source 14 as the case may be, which starts integration. After having executed specific operations, the CPU 13 ends the integration. The final integration is effected in the passive mode.

Following that, the CPU 13 performs correlation operation and selects the shortest distance (step S8).

Specifically, after having ended the final integration in the passive mode, the CPU 13 causes the storage section 9 to store the integrated amount for each photoelectric conversion element which corresponds to the image signal of a subject. Thereafter, the CPU 13 causes the output section 10 to output the image signals of the subjects. Although the CPU 13 may obtain all of the image signals of the subjects, the way the CPU 13 obtains the image signals only from the distance-measuring are set at step S5 or S6 is more efficient.

On the basis of the obtained image signals of the subjects, the CPU 13 performs correlation operation on each distance-measuring area, thereby finding the phase difference between the subject images for the individual distance-measuring areas. The phase difference corresponds to the distance to a subject. Then, the shortest distance is selected from the subject distances obtained from the distance-measuring areas. The shortest subject distance is judged to be the final result of the distance measurement.

After the above processes, the CPU 13 executes post-processes, including the process of turning off the power supply of the AFIC 3, and completes the series of distance-measuring processes (step S9).

As described above, the operations the CPU 13 performs may be executed under the control of the AFIC 3.

For example, as described earlier in the prior art, when distance measuring is done over a very wide range using a one-dimensional or two-dimensional sensor, the number of distance-measuring areas set is very large. This means that complex calculations, such as correlation operation, must be repeated a very large number of times, resulting in a very great time-lag or a rise in cost because of use of a high-speed, expensive CPU.

In contrast, with the embodiment of the present invention, the position of the main subject can be estimated by doing pre-integration for a specific short time in the active mode, with the steady-state light removing section 6 being enabled and the projecting source 14 being lit, and by obtaining the distribution (image signal) of the reflected light from the subject struck by the light emitted from the projecting source 14.

Consequently, with the embodiment, because the necessary minimum distance-measuring area can be set to sense the distance to the estimated main subject with high accuracy, it is unnecessary to do needless calculations. Namely, a high-speed, expensive CPU 13 is not required and the time-lag does not increase seriously.

The configuration, operation, and effect of the embodiment of the present invention have been outlined.

Referring to the flowchart of FIG. 7, the operation of the distance-measuring device according to the embodiment will be explained. In the explanation below, various flowcharts, photographic scenes, and diagrams related to the sensor data by pre-integration (in the active mode) and final integration (in the passive mode) will be referred to suitably.

First, the CPU 13 effects the initial setting of the distance-measuring device (step S11).

Figure 2:
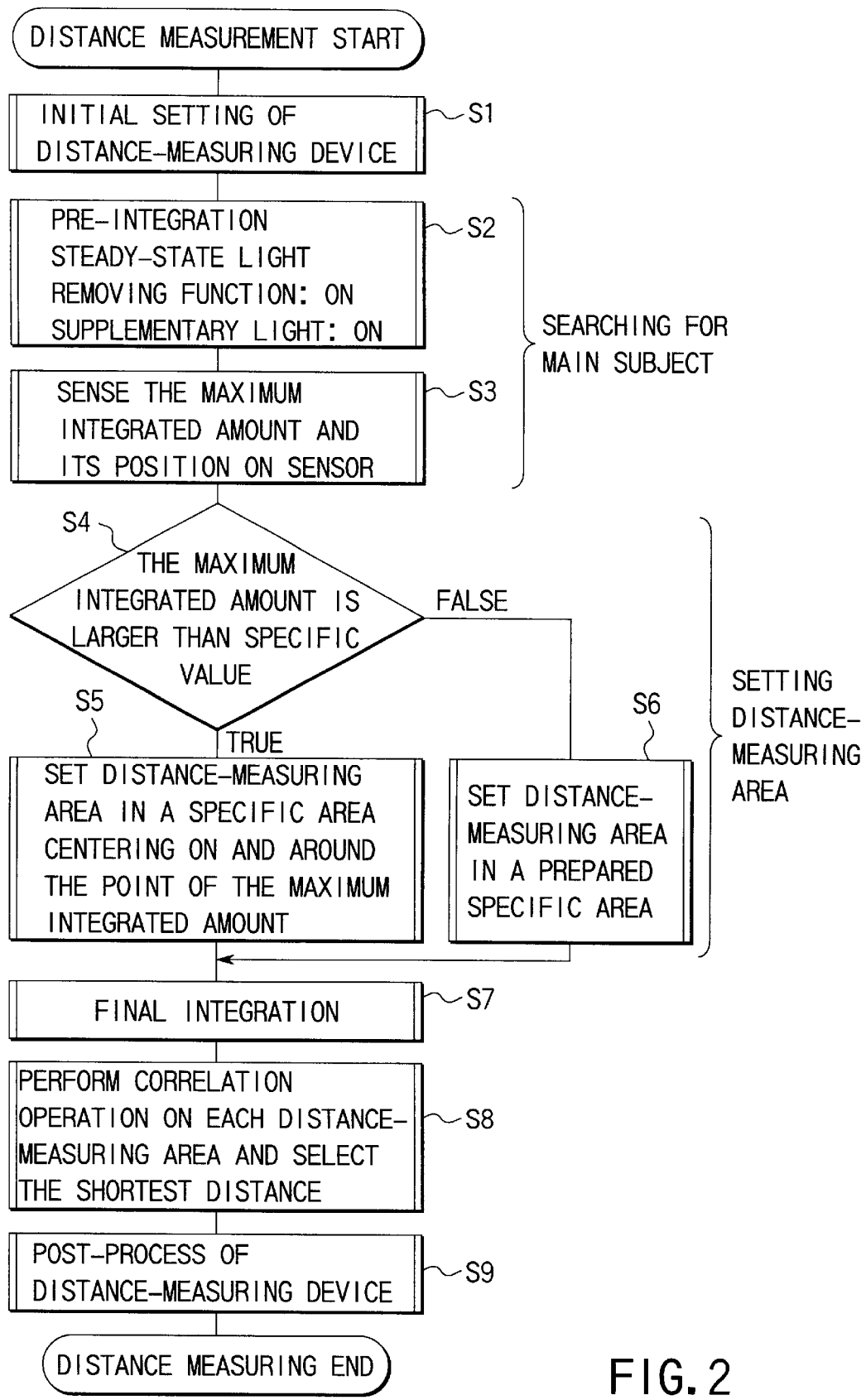
FIG. 2 is a flowchart to help give a detailed explanation of the operation of the distance-measuring device according to the embodiment.

Step S11 carries out the same process as in step S1 of FIG. 2. In step S11, the CPU 13 resets not only itself but also the photocurrent integration section 5, steady-state light removing section 6, monitor signal sensing range setting and monitor signal output section 8, and storage section 9.

Then, the CPU 13 does pre-integration 1 (step S12).

Although the pre-integration 1 has not been done in FIG. 2, it is done here to determine some of the integration conditions for final integration. The steady-state light removing section 6 is disabled. Although not shown, means for setting and changing the sensor sensitivity of the photoelectric conversion elements is provided and sets the sensor sensitivity high. The sensor sensitivity may be changed by changing the amplification factor or the capacity of integration. The projecting source 14 is turned off and the light from the subject is integrated in the passive mode. The integration control is performed only for a predetermined short time.

Next, the CPU 13 senses the maximum integrated amount in the pre-integration 1 (step S13). This is related to the luminance at the brightest part of the subject and is used to determine the sensor sensitivity in final integration and the presence or absence of supplementary light. The monitor signal outputted after the integration may be used as the maximum integrated amount. Following that, the CPU 13 determines part of the integration conditions for final integration (step S14). The primary conditions include the sensor sensitivity and the presence or absence of supplementary light.

Then, the CPU 13 executes pre-integration 2 (step S15).

Pre-integration 2 is the same as pre-integration at step S2 in the flowchart of FIG. 2. It is done to estimate the position of the main subject and set a distance-measuring area for final integration. The steady-state light removing section 6 is enabled and the sensor sensitivity is set high.

The projecting source 14 is turned on and integration control is performed for a predetermined specific short time. Since the operation is in the active mode, the reflected light from the subject struck by the light emitted from the projected light source 14 is integrated.

Thereafter, the CPU 13 senses the maximum integrated amount in the integration and its position on the sensor (step S16). It is assumed that the main subject is preset at the position of the maximum integrated amount. The maximum integrated amount is the greatest one of the reflected rays of light from the subject struck by the light emitted from the projecting source 14. Thus, there is a strong possibility that the subject is the closest one and at the same time, the main subject.

Referring to the flowchart of FIG. 8, the way of searching the main subject in steps S15 and S16 will be explained in further detail.

First, the CPU 13 judges whether the AF mode of the camera is in the normal mode or the spot mode (step S31). The spot mode is one phase of the AF mode in which distance measuring is done only for the central part of the screen. In the spot mode, the main subject is not searched for at all and control is returned.

On the other hand, when the AF mode is not in the spot mode, the CPU 13 executes pre-integration 2 as in step S15 (step S32). Then, the CPU 13 acquires the sensor data by the pre-integration in the active mode from the AFIC 3, or the image signal of the reflected light from the subject struck by the light emitted from the projecting source 14 (step S33).

Then, the CPU 13 searches for maximal values of the image signal obtained at step S33 and extracts only the maximal values in a specific range (Pmax to Pmin) (step S34).

Figure 9:
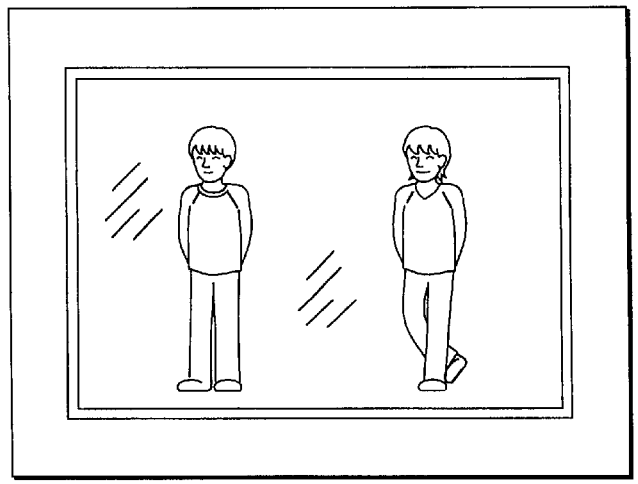
FIG. 9 shows an example of a photographic scene.
Figures 10A, 10B:
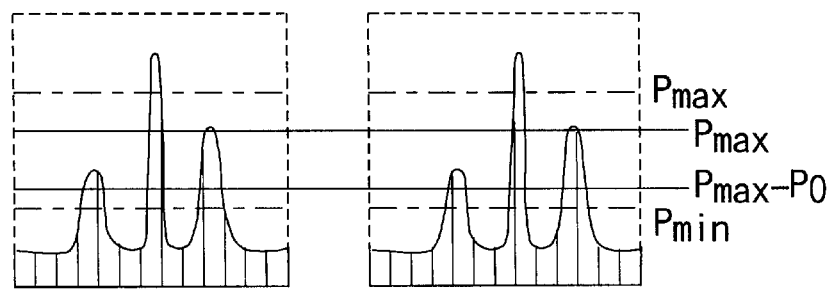
FIG. 10A shows the sensor data produced by the light-receiving element 4a corresponding to the photographic scene of FIG. 9.
FIG. 10B shows the sensor data produced by the light-receiving element 4b corresponding to the photographic scene of FIG. 9.

For example, in a case where mannequins in a show window are subjects as shown in FIG. 9, pre-integration in the active mode produces image signals as shown in FIGS. 10A and 10B. In such image signals, searching for maximal values extracts three maximal values. The maximal values correspond to the image signal of the right mannequin, the image signal by regular reflection from the glass, and the image signal of the left mannequin from left to right.

Figures 10C, 10D:
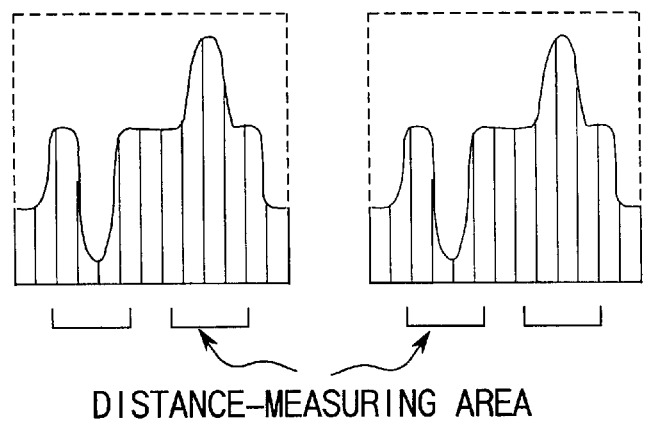
FIG. 10C shows the distance-measuring area corresponding to FIG. 10A.
FIG. 10D shows the distance-measuring area corresponding to FIG. 10B.

When only the values in the specific range (Pmax to Pmin) are extracted from the maximal values as shown in FIGS. 10C an 10D, the image signal by regular reflection from the glass can be removed, which prevents errors in estimating the main subject.

Figure 8:
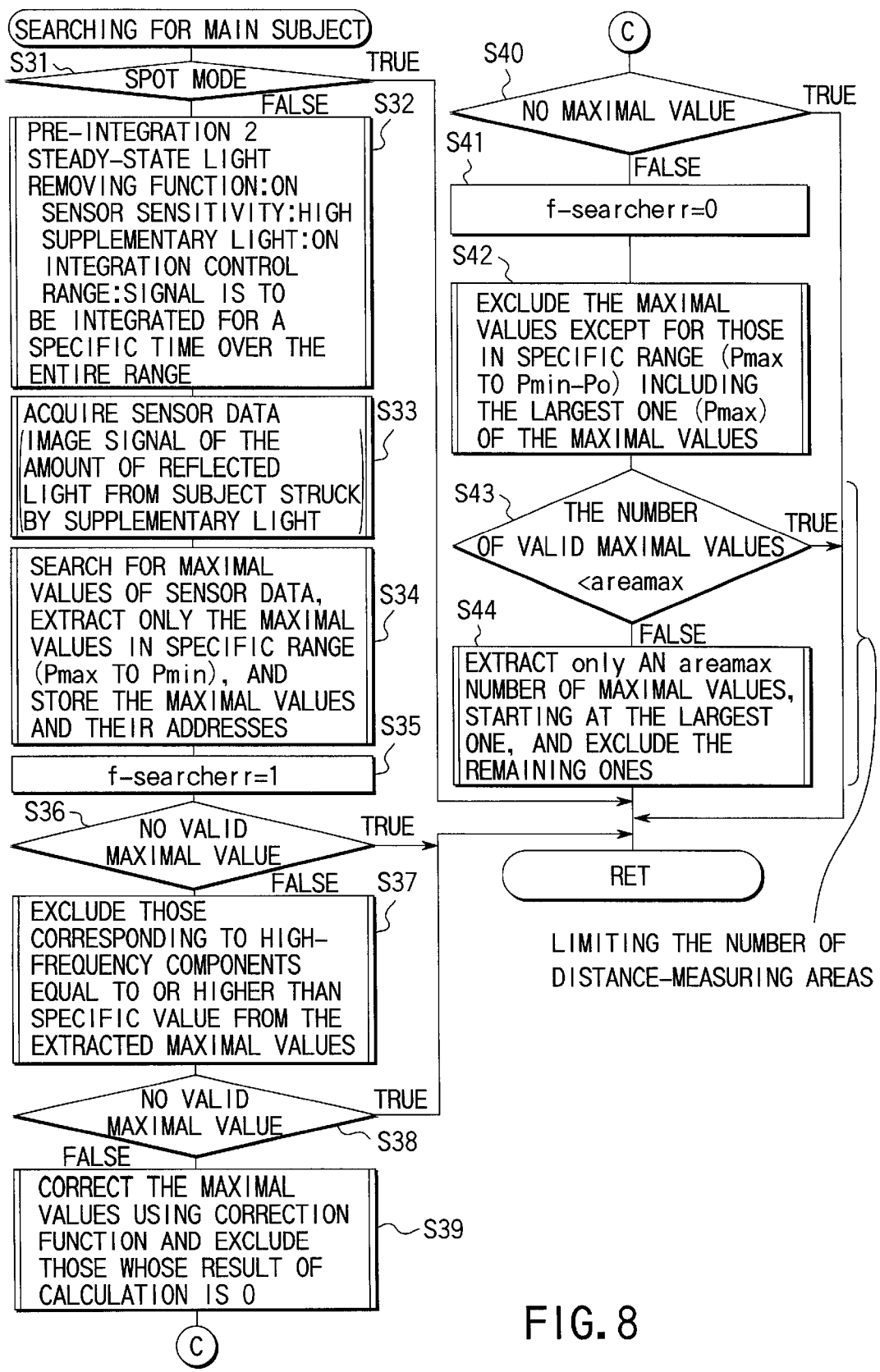
FIG. 8 is a flowchart to help give a more detailed explanation of search of the main subject in steps S15 and S16 in FIG. 7.

In FIG. 8, at the following step S35, the CPU 13 sets flag f-searcherr to "1". The flag f-searcherr indicates that no valid maximal value has been sensed from the image signals produced by the pre-integration. The flag f-searcherr is supposed to be reset to "0", when a valid maximal value is left.

Then, the CPU 13 judges whether or not a valid maximal value is present (step S36). If there is no valid maximal value, control is returned. If there is a valid maximal value, the frequency of the image signals produced by the pre-integration is analyzed and those corresponding to high-frequency components higher than a specific value are removed from the maximal values (step S37). Although most of the regular reflection from the glass can be removed at step S34, part of the reflection cannot be removed because of the reflection angle of the glass and the distance to the glass. In the case of reflection from a lustrous thing, such as glass, most of the image signals have high frequencies. Therefore, the reflection image signals produced by lustrous things, such as glass, can be removed completely at step S34 and step S37.

Thereafter, as in step S36, the CPU 13 judges whether or not a valid maximal value is present (step S38). If there is no valid maximal value, control is returned. If there is a valid maximal value, the next step S39 is executed. The maximal values are corrected using a correction function and those whose result is zero are removed.

Figure 13:
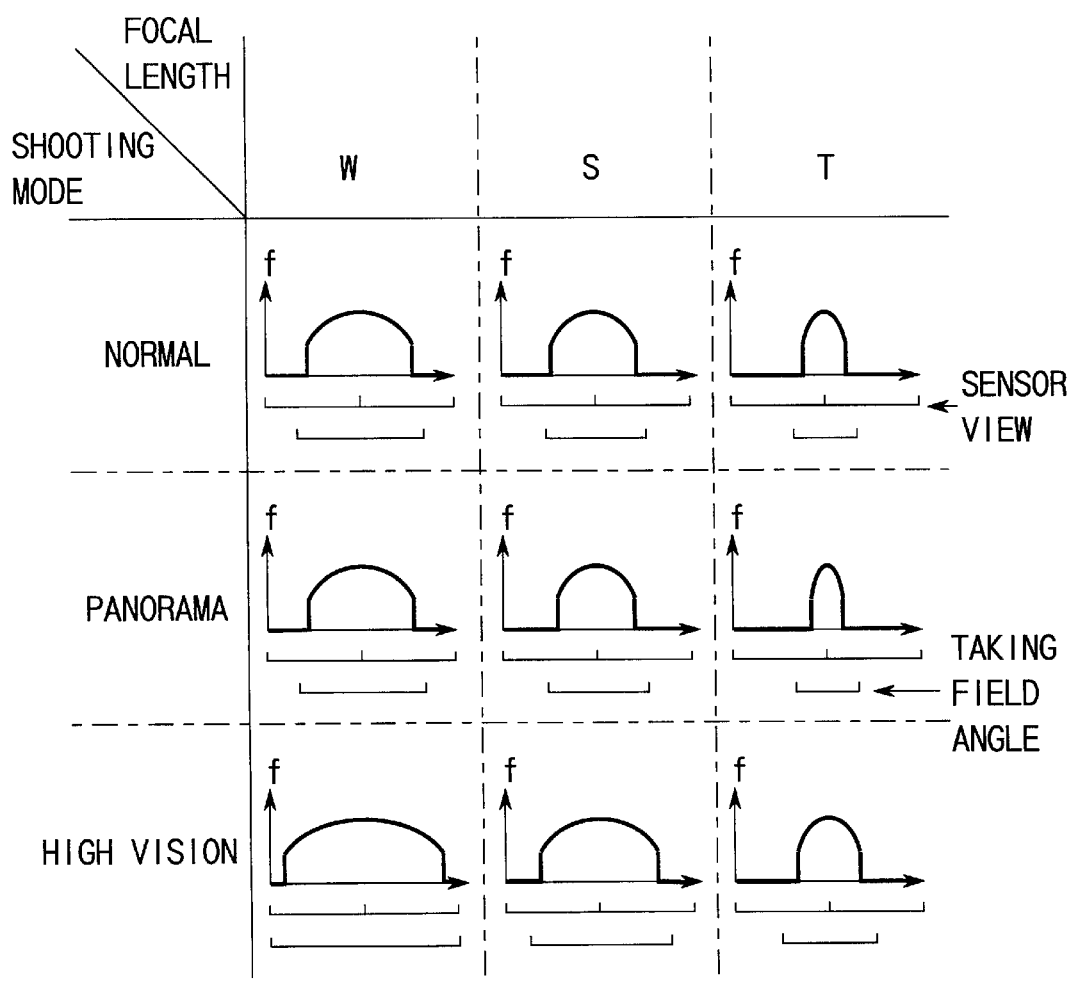
FIG. 13 is an illustration to help explain a correction function.

The correction function is a function of the position on the sensor, the focal length of the taking optical system of the camera, and the shooting screen mode (normal, panorama, and high vision) of the camera. FIG. 13 shows an example of the correction function. The meaning of the correction function will be explained below.

First, the taking field angle (range) is determined by the focal length of the taking optical system of the camera and the input information in the shooting screen mode of the camera. An example of the correction function is the probability of presence of the main subject for each position with respect to the taking field angle of the camera. FIG. 13 shows the taking field angle corresponding to the focal length for each type of image pickup.

As shown in FIG. 13, the probability of presence of the main subject is high in the central part of the screen and becomes lower closer to the periphery of the screen. Near the outer edge of the screen, the probability of existence is almost zero. Then, the taking field angle of the camera is related to the position on the sensor and the maximal values are corrected using the correction function, which enables the weighted extraction or removal of maximal values.

For example, explanation will be given using the scene of FIG. 11.

In a case where the main subject is present near the center of the screen and minor subjects are present at the right and left ends, doing pre-integration in the active mode produces an image signal as shown in FIGS. 12A to 12D. In FIGS. 12A to 12D, the left maximal value, another maximal value, and the rightmost value correspond to the image signal produced by the main subject and image signals produced by the minor subjects near the screen edges, respectively. Because the image signals of the minor subjects at both ends of the screen have no maximal values, they are ignored. This is one approach of removing minor subjects.

The image signal produced by the pre-integration has two maximal values. When the two values are corrected using the correction function, that is, for example, they are multiplied by the correction function, the maximal values present in the peripheral part of the screen are removed, which enables removal of the minor subjects on the periphery of the screen.

In FIG. 8, after the above process, the CPU 13 judges again whether or not a valid maximal value is present (step S40). If there is no valid maximal value, control is returned. If there is a valid maximal value, flag f-searcherr is reset to zero, because at least one valid maximal value is present at this point in time (step S41).

The fact that flag f-searcherr is "0" means that a valid maximal value has been found. Thereafter, the CPU 13 narrows the maximal values down further and removes the maximal values excluding those in the specific range (Pmax to Pmin-Po) including the maximum (Pmax) of the remaining maximal values (step S42).

In the scene of FIG. 9, there are two mannequins, one wearing a light dress and the other wearing a dark dress. In this way, each subject has a color and the difference in color leads to a difference in reflectivity. In a case where the main subject at the shortest distance is estimated on the basis of the amount of reflected light, the reflectivity of such a subject cannot be ignored. In the embodiment, the maximal values included in the range of Po are treated equally, thereby preventing erroneous distance measurement due to errors in estimating the position of the main subject caused by the reflectivity of the subject.

As described above, executing steps S32 to S42 makes it possible to extract maximal values of the image signals produced by the pre-integration including maximal values caused by at least the main subject, without the influences of the regular reflection, minor subjects on the periphery of the screen, and the reflectivity of the main subject.

Then, the CPU 13 judges whether or not the number of remaining valid maximal values is larger than a specific number areamax (step S43). If the number is larger than areamax, the CPU 13 narrows the maximal values down further to as few as areamax, counting from the largest one (step S44).

By setting the necessary minimum number of distance-measuring areas, which is one of the objects of the present invention, steps S43 and S44 prevent more distance-measuring areas than are needed from being set contrary to the intention of realizing a wide range multi-AF without an increase in time-lag.

Steps S43 and S44 in FIG. 8 correspond to the function of limiting the number of distance-measuring areas. The way of limiting the number of distance-measuring areas will be explained in further detail by reference to the flowchart of FIG. 14.

First, the number of distance-measuring areas is set to the upper limit of the number of distance-measuring areas that can be set, that is, areamax=k0 (step S50). This is a case where the camera is in the auto (normal) mode with k0 being set at a default value.

Then, it is judged whether or not the AF mode of the camera is the spot mode (step S51). If it is the spot mode, areamax is set at 1 or k1 (areamax=1 or k1) (step S52). If it is not the spot mode, the next step S53 is executed.

Next, it is judged whether or not the AF mode of the camera is the moving-object mode (step S53). If it is the moving-object mode, areamax is set at 1 or k2 (areamax=1 or k2) (step S54). If it is not the moving-object mode, the next step S55 is executed.

Then, it is judged whether or not the AF mode of the camera is the remote control mode (step S55). If it is the remote control mode, areamax is set at k3 (step S56). If it is not the remote control mode, the next step S57 is executed.

Next, it is judged whether or not the AF mode of the camera is the self mode (step S57). If it is the self mode, areamax is set at k4 (areamax=k4) (step S58). If it is not the self mode, the next step S59 is executed.

The relationship between the above invariables is as follows:

$$1 \leq k1 \leq k2 < k0 < k3 \leq k4 \tag{1}$$

In the embodiment, the number of distance-measuring areas is decreased in the spot mode in which the distance-measuring areas are limited to the central part and in the operation modes that do not permit a large time-lag, whereas the number of distance-measuring areas is increased in the remote control mode and self mode that permit a large time-lag.

Next, it is judged whether or not the number of valid maximal values is larger than areamax (step S59). If the number of valid maximal values is larger than areamax, the number of valid maximal values is reduced to areamax (step S60). In this case, the maximal values may be reduced to as few as areamax, starting at the largest maximal value. When the correction function has not been used, it may be used. An areamax number of maximal values may, of course, be extracted from the central part of the screen, regardless of the correction function.

Figure 15:
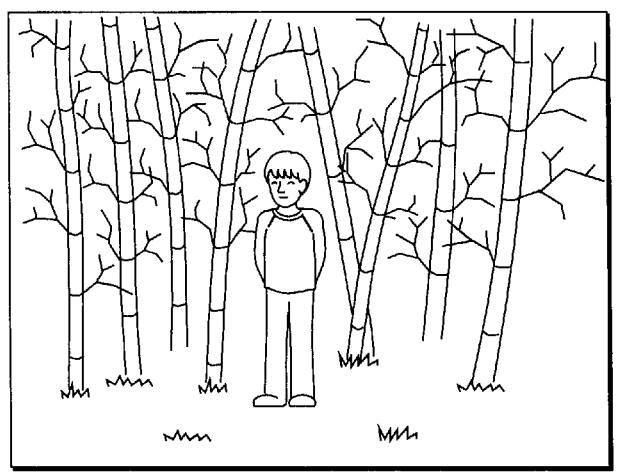
FIG. 15 shows an example of a photographic scene.

The scene of FIG. 15 will be explained. When the main subject is close to the background and the background has a complex composition, the image signal produced by pre-integration (in the active mode) is as shown in FIGS. 16A to 16D.

Figures 16A, 16B:
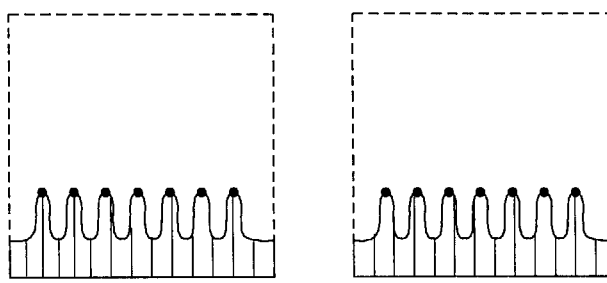
FIG. 16A shows the sensor data produced by the light-receiving element 4a corresponding to the photographic scene of FIG. 15.
FIG. 16B shows the sensor data produced by the light-receiving element 4b corresponding to the photographic scene of FIG. 15.
Figures 16C, 16D:
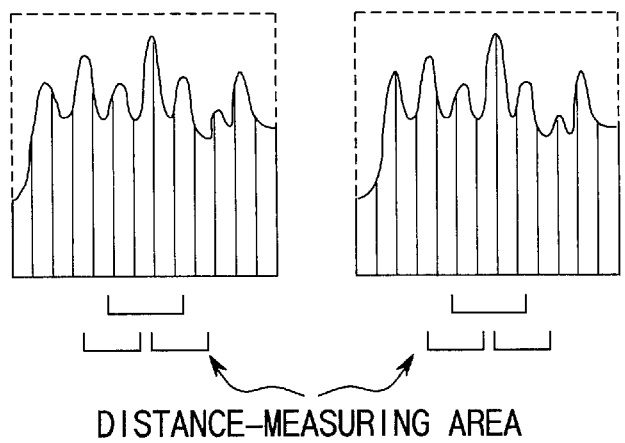
FIG. 16C shows the distance-measuring area corresponding to FIG. 16A.
FIG. 16D shows the distance-measuring area corresponding to FIG. 16B.

Specifically, if the function of limiting the number of distance-measuring areas were absent, seven areas area would be set as shown in FIGS. 16A and 16B and time-lag might occur for each of the seven areas. In contrast, use of the function of limiting the number of distance-measuring areas enables only three areas to be set as shown in FIGS. 16C and 16D, preventing an increase in the time-lag.

Figure 14:
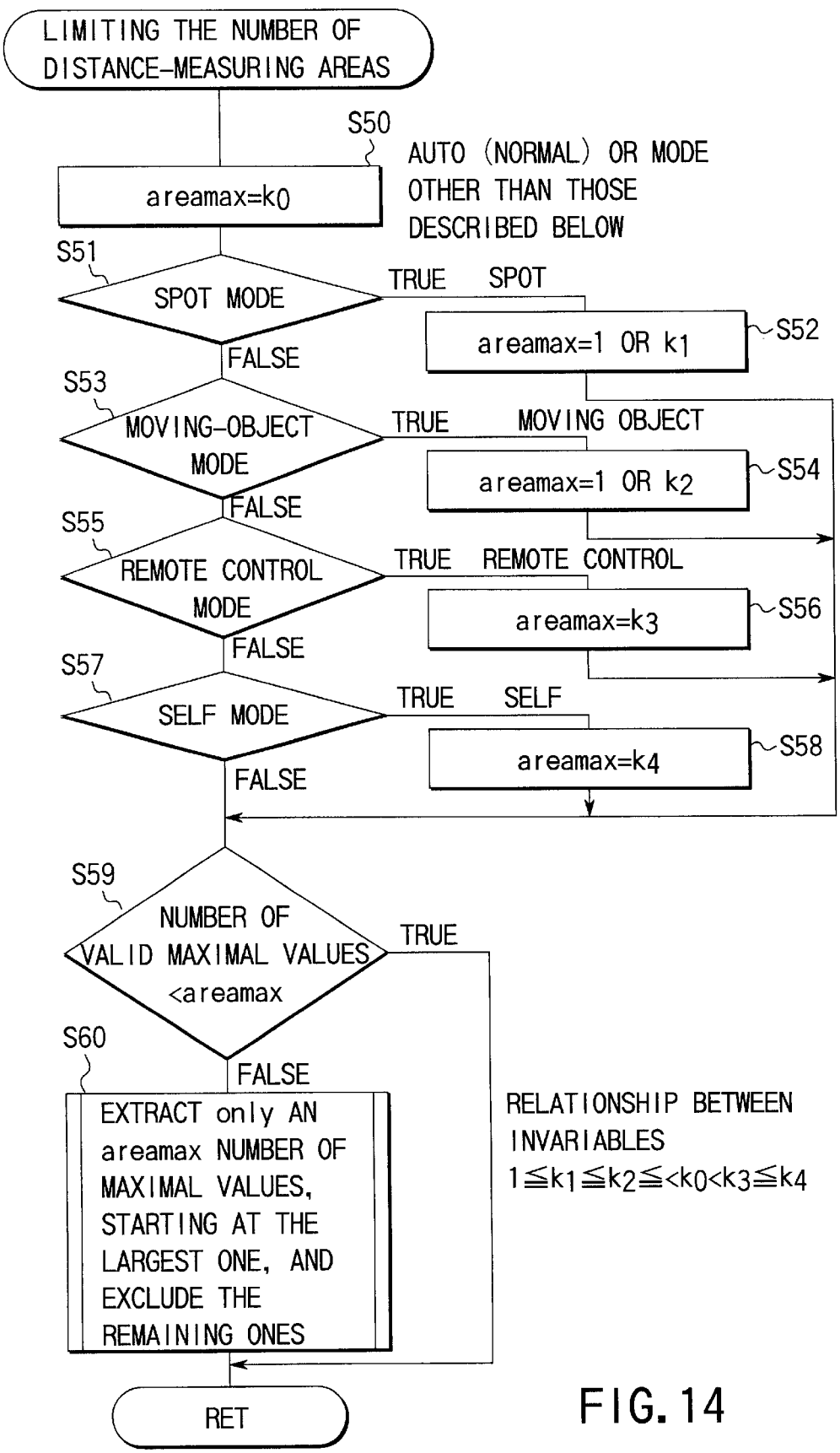
FIG. 14 is a flowchart to help give a more detailed explanation of limitation on the number of distance-measuring areas in steps S43 and S44 in FIG. 8.

The way of searching for the main subject and the way of limiting the number of distance-measuring areas have been explained using the flowcharts in FIGS. 8 and 14 and other figures. Up to now, the necessary information to set the necessary minimum number of distance-measuring areas including at least the main subject has been obtained.

Next, the processes after step S17 in the flowchart of FIG. 7 will be explained. At step S17 of FIG. 7, it is judged whether or not the maximum integrated amount is larger than a specific value. This means that it is judged whether or not a valid maximal value is present, adapting the contents to the detailed levels as shown in FIGS. 8 and 14.

If the maximum integrated amount is larger than the specific value or there is a valid maximal value, a distance-measuring area is set on the basis of the point of the maximum integrated amount or the point of the valid maximal value (step S18). In contrast, if the maximum integrated amount is equal to or smaller than the specific value or there is no valid maximal value, a distance-measuring area is set in a prepared area (default area) (step S19).

Step S17 to step S19 correspond to the function of setting a distance-measuring area.

Figure 17:
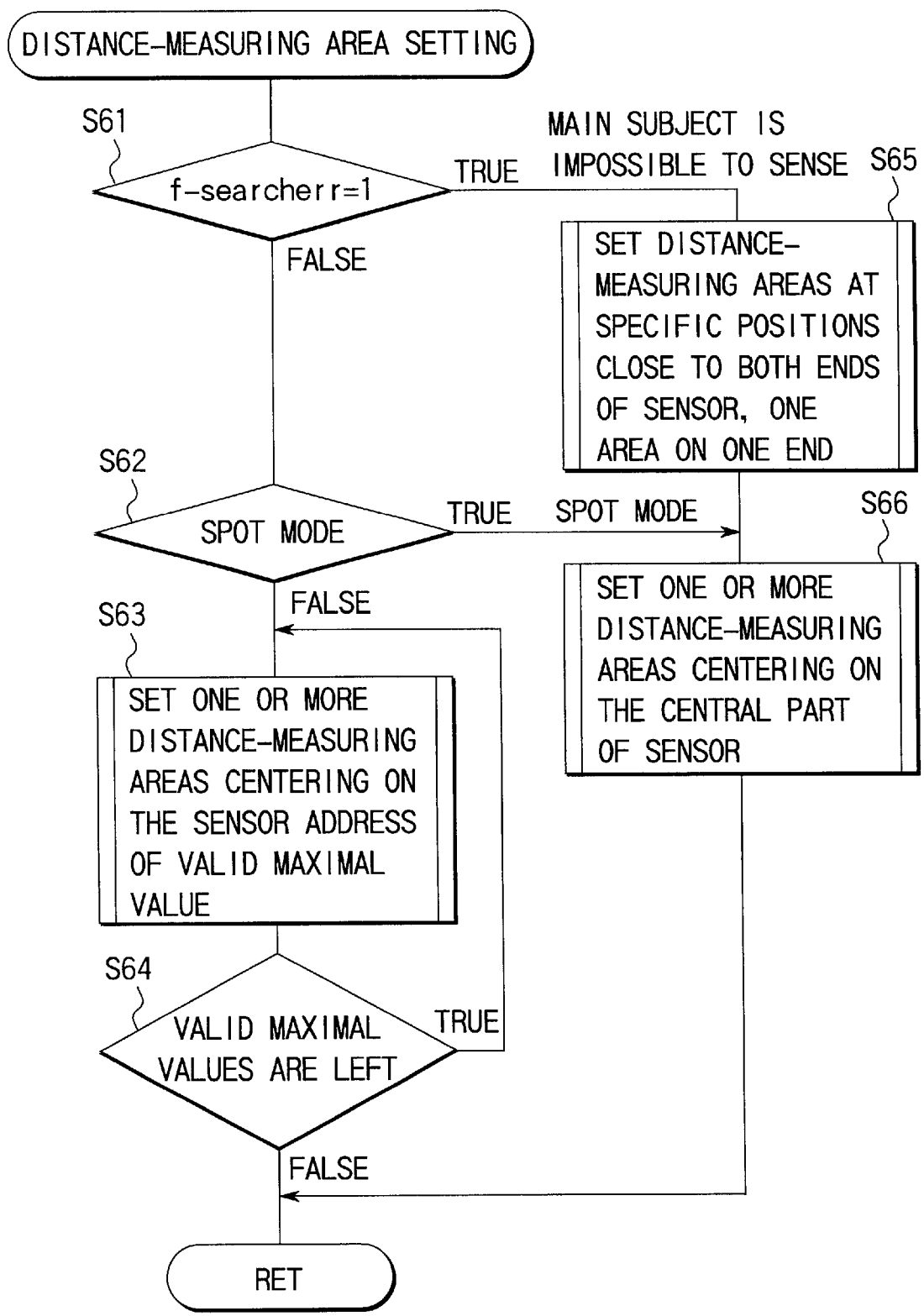
FIG. 17 is a flowchart to help give a more detailed explanation of the distance-measuring area setting function related to steps S17 to S19 in FIG. 7.

Hereinafter, referring to the flowchart of FIG. 17, the function of setting a distance-measuring area will be explained in further detail.

First, the CPU 13 judges the value of f-searcherr (step S61). If f-searcherr=0, it is judged that there is a valid maximal value, or the position of the main subject can be estimated. If f-searcherr=1, it is judged that there is no valid maximal value, or the position of the main subject is impossible to estimate. Then, it is judged whether or not the AF mode of the camera is the spot mode (step S62).

Generally, a distance-measuring area is set (step S63). Namely, one or more distance-measuring areas are set, centering around the sensor address of the valid maximal value.

Then, step S202 is repeated until the valid maximal values for which distance-measuring areas have not been set have run out, thereby setting a distance-measuring area for each valid maximal value.

If the AF mode of the camera is the spot mode at step S62, a distance-measuring area is set in the prepared specific area (default area) (step S66). More specifically, one or more areas are set in the vicinity of the center of the sensor. The vicinity of the center of the sensor is, in other words, the vicinity of the center of the shooting screen. When two or more areas are set, they may or may not be overlapped partially with each other.

If the position of the main subject is impossible to estimate, a distance-measuring area is set (steps S65, S66). At step S66, a distance-measuring area is set in the vicinity of the center of the shooting screen as described above. At step S65, a distance-measuring area is set around the area set at step S66. The number of areas set is one or more on each side of the periphery of the spot area. The distance-measuring areas set at step S65 may or may not be overlapped partially with each other. In addition, the areas set at steps S65 and S66 may or may not be overlapped partially with each other.

Regarding the scene of FIG. 11, the technique for taking a picture in the spot mode may be used. In this case, a distance-measuring area is set in a specific area, regardless of the position of the main subject estimated as shown in the figure.

Figure 5:
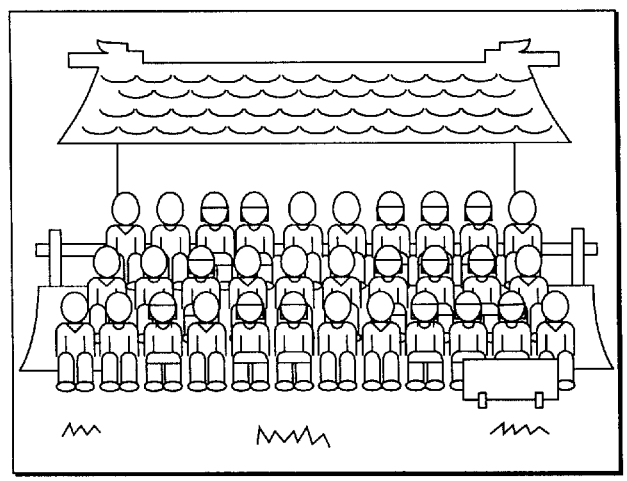
FIG. 5 shows an example of a photographic scene.
Figure 6A:
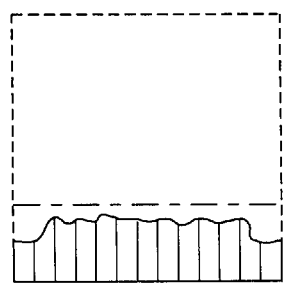
FIG. 6A shows the sensor data produced by the light-receiving element 4a corresponding to the photographic scene of FIG. 5.
Figure 6B:
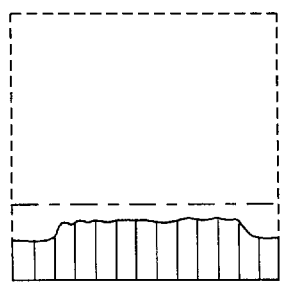
FIG. 6B shows the sensor data produced by the light-receiving element 4b corresponding to the photographic scene of FIG. 5.
Figure 6C:
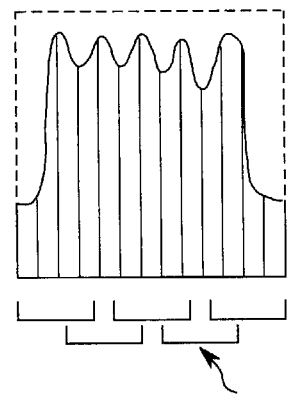
FIG. 6C shows the distance-measuring area corresponding to FIG. 6A.
Figure 6D:
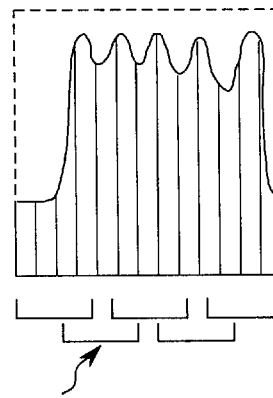
FIG. 6D shows the distance-measuring area corresponding to FIG. 6B.

In the case of the scene shown in FIG. 5, the position of the main subject is impossible to estimate and a distance-measuring area is set in the specific area. In this case, it is conceivable that one area in the center is set at step S66 and four areas around the center are set at step 65. In addition, it is also possible to set three areas in the center at step S66 and two areas around the center at step S65. In this way, there are many variations in the way of setting the areas.

As one variation, step S63 of FIG. 17 will be explained in detail by reference to the flowchart of FIG. 18.

Figure 18:
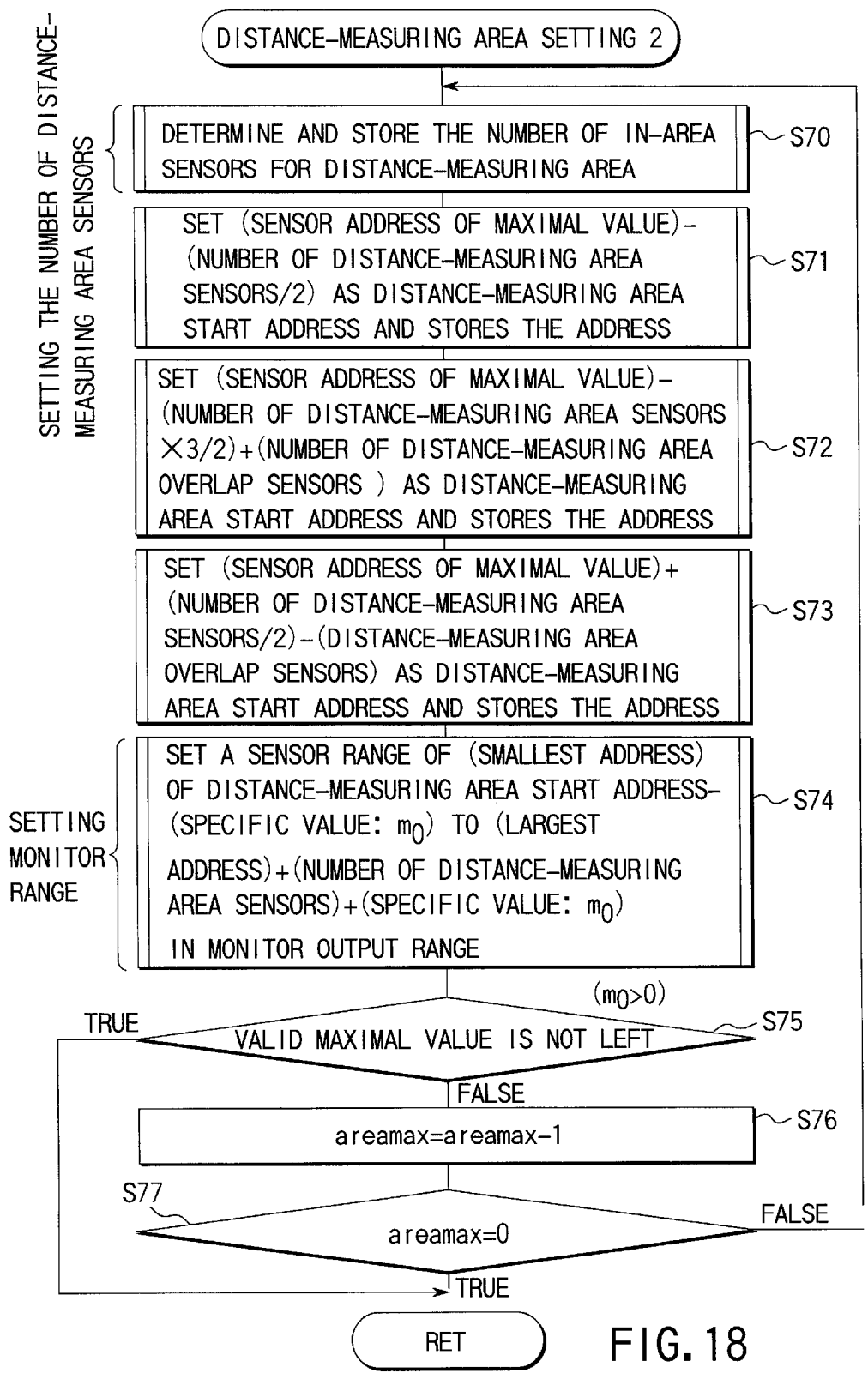
FIG. 18 is a flowchart to help give a more detailed explanation of the operation in step S63 in FIG. 17.

In the concept of FIG. 18, three distance-measuring areas are set for a single valid maximal value, with one distance-measuring area overlapping partially with either of the remaining two areas.

Specifically, the number of in-area sensors in a distance-measuring area set by the maximal value is determined and stored (step S70). The purpose of this step is to prevent near and far subjects from mixing with each other, which is unsuitable for the passive AF. When the maximal value is small, this means that the subject is far. For the far subject, the number of in-area sensors is decreased. On the other hand, when the maximal value is large, this means that the subject is near. For the near subject, the number of in-area sensors is increased.

Figures 19, 20A, 20B:
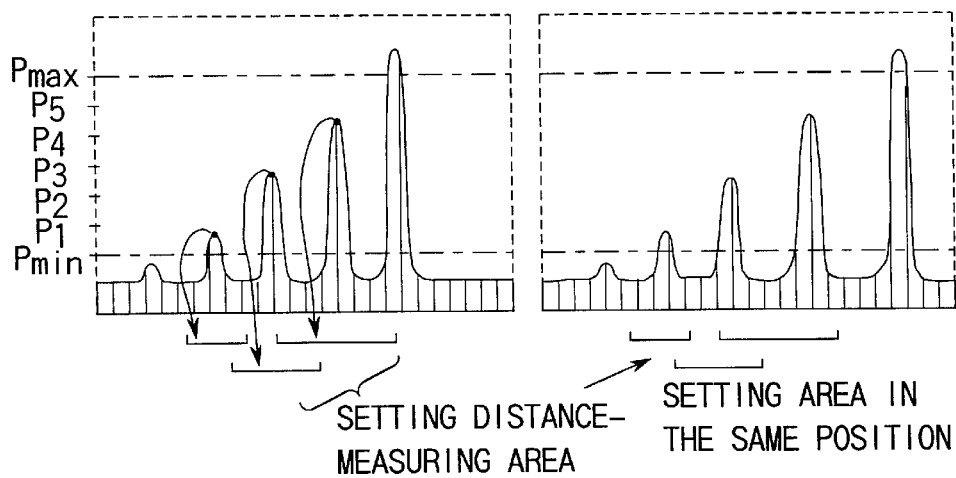
FIG. 19 is a table for determining the number of in-area sensors.
FIG. 20A is a diagram showing an image signal obtained through pre-integration by the light-receiving element 4a in the active mode and FIG. 20B is a diagram showing an image signal obtained through pre-integration by the light-receiving element 4b.

Actually, to determine the number of in-area sensors on the basis of the maximal value, a table as shown in FIG. 19 is referred to and the number of in-area sensors is determined.

FIGS. 20A and 20B shows image signals produced by pre-integration in the active mode. As shown in the figure, the number of in-area sensors is determined according to the maximal value and a distance-measuring area is set. Hereinafter, the position in which a distance-measuring area is set will be explained.

Of two image signals, either the right-side image signal (produced by the photoelectric conversion element 4b of FIG. 1) or the left-side image signal (produced by the photoelectric conversion element 4a of FIG. 1) is set as a reference. In the embodiment, the left-side image signal is set as a reference.

As shown in FIGS. 20A and 20B, a distance-measuring area is set in an area centering around the valid maximal value of the left-side signal. As for the right-side signal, a distance-measuring area is set in the same position on the sensor as with the left-side signal, regardless of the position of the valid maximal value. In the explanation until now, when a valid maximal value is extracted, the area from which the valid maximal value is extracted has not been limited. If the left-side image signal is used as a reference, it is not necessary to extract a valid maximal value using the right-side image signal.

As seen from FIGS. 20A and 20B, the image signal of a nearer subject has a larger phase difference, whereas the image signal of a farther subject has a smaller phase difference. In this respect, the embodiment sets a wider distance-measuring area for a nearer subject and a narrower distance-measuring area for a farther subject, which makes sense.

For example, the scene of FIG. 21, the person and gateway to a Shinto shrine behind are intermingled in perspective. In pre-integration, however, there is no means for sensing the corruption of perspective and whether the subject is far or near is estimated. As shown in FIGS. 22A to 22D, if the subject is estimated to be far, setting a narrow distance-measuring area prevents erroneous distance measurement due to the corruption of perspective. This completes explanation of step S70. Next, at step S71, a first distance-measuring area is set for the valid maximal value.

The start address for the distance-measuring area is:

$$((\text{the sensor address for the maximal value}) - (\text{the number of in-area sensors}))/2 \quad (2)$$

The distance-measuring area is set on the basis of the start address for the area and the number of in-area sensors.

Then, a second area is set. The start address for the second area is:

$$((\text{the sensor address for the maximal value}) - (\text{the number of in-area sensors})) \times 3/2 + (\text{the number of overlap sensors}) \quad (3)$$

At step S403, a third area is set. The start address for the third area is:

$$((\text{the sensor address for the maximal value}) + (\text{the number of in-area sensors}))/2 - (\text{the number of overlap sensors}) \quad (4)$$

To set the second and third areas, new invariable, the numbers of overlap sensors, are needed (steps S72 and S73).

Then, a monitor signal sensing range is set (step S74).

The monitor signal is a signal used to control the integration of photocurrent as described in FIG. 1. It is generally obtained by sample-holding the integrated amount in the part of the subject which is the brightest in the light-receiving range of the photoelectric conversion element. The monitor signal sensing range is set so as to correspond to the position of the distance-measuring area.

Specifically, the monitor signal sensing range is set in an area which includes three distance-measuring areas set for a single valid maximal value and is larger than the three distance-measuring areas by a specific amount (m0 in the number of sensors). To set the range, the start address and end address of the range are calculated and stored.

The start address is:

$$(\text{left-side distance-measuring area start address}) - m0 \quad (5)$$

The end address is:

$$(\text{right-side distance-measuring start address}) + (\text{the number of in-area sensors}) + m0 \quad (6)$$

Figure 23:
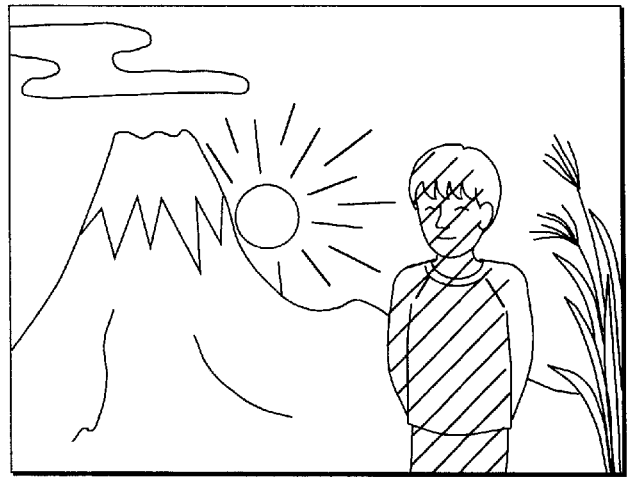
FIG. 23 shows an example of a photographic scene.

The effect of setting the monitor signal sensing range will be explained, taking the scene of FIG. 23 as example. The scene is an example of a high-luminance light source being included in the shooting screen. It is difficult to sense the situation using pre-integration in the active mode.

Figure 24A:
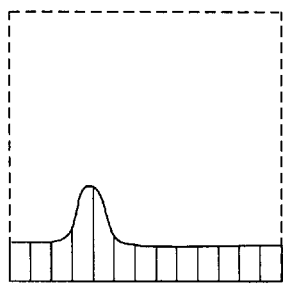
FIG. 24A shows the sensor data produced by the light-receiving element 4a corresponding to the photographic scene of FIG. 23.
Figure 24B:
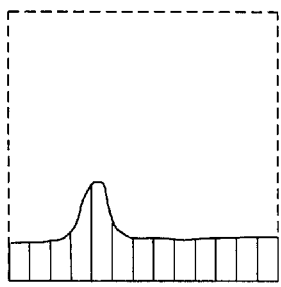
FIG. 24B shows the sensor data produced by the light-receiving element 4b corresponding to the photographic scene of FIG. 23.
Figure 24C:
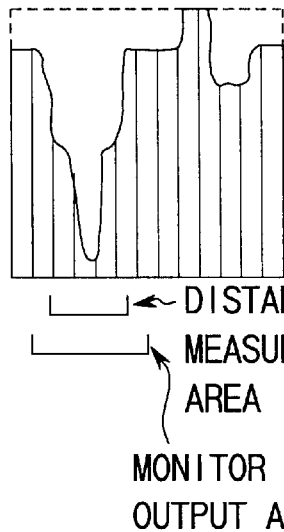
FIG. 24C shows the distance-measuring area corresponding to FIG. 24A.
Figure 24D:
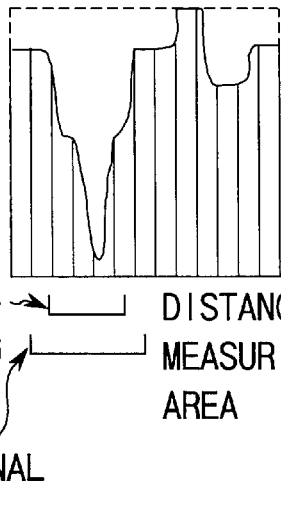
FIG. 24D shows the distance-measuring area corresponding to FIG. 24B.
Figure 24E:
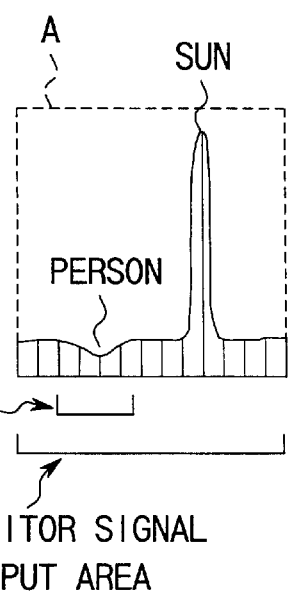
FIG. 24E shows the result of final integration with the monitor signal sensing range being set for the entire sensor.

To cope with this difficulty, a distance-measuring area is set according to the result of the preintegration, followed by final integration. FIG. 24E shows the result of the final integration when the monitor signal sensing range is set for all the sensors. Because the final integration is so controlled that the integrated amount of the sun is not saturated on the basis of the sun, the image signal of the person, the main subject, is corrupted over the set distance-measuring area. Namely, it is impossible to measure the distance. In contrast, when the monitor signal sensing range is set according to the distance-measuring area, the final integration is controlled optimally for the main subject. Therefore, it is not impossible to measure the distance.

Figure 25:
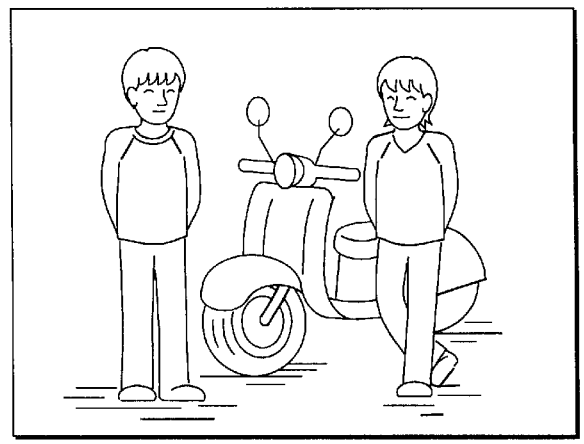
FIG. 25 shows an example of a photographic scene.
Figures 26A, 26B:
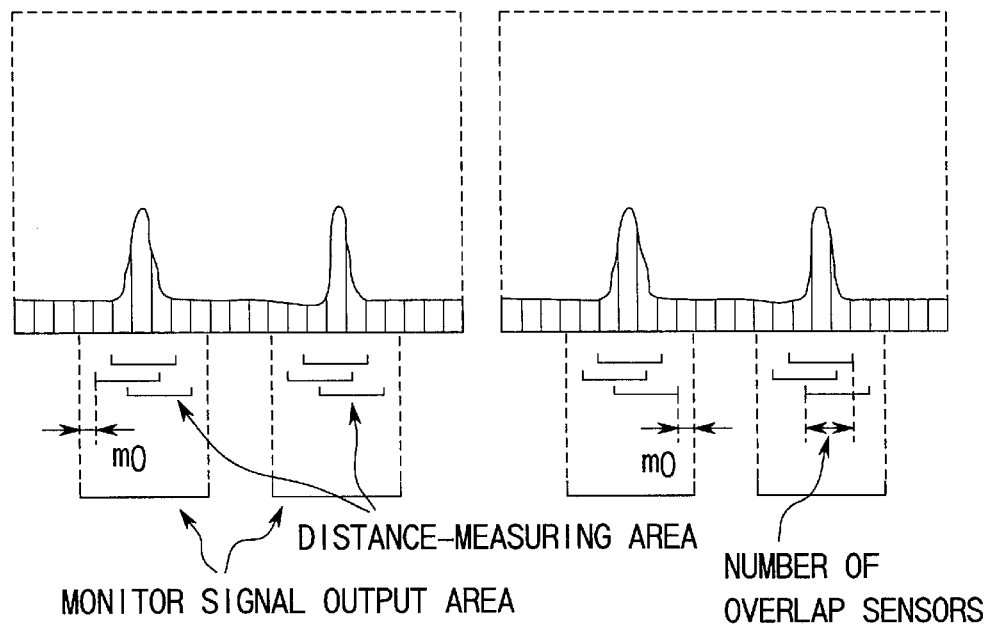
FIG. 26A shows the sensor data produced by the light-receiving element 4a corresponding to the photographic scene of FIG. 25
FIG. 26B shows the sensor data produced by the light-receiving element 4b corresponding to the photographic scene of FIG. 25.

Similarly, the scene of FIG. 25 is an example which is liable to permit erroneous distance measurements because the headlight of the motorbike permits control of final integration to be extracted. With the present embodiment, however, erroneous distance measurements can be prevented. The positional relationship between the distance-measuring areas and the monitor signal sensing ranges is obtained when the flowchart of FIG. 18 is executed.

In FIG. 18, it is judged whether or not any valid maximal value is left. If there is no valid maximal value left, control is returned. If there is a valid maximal value left, areamax is decremented at step S76. Then, if areamax is not zero at step S77, a valid maximal value is surely left and therefore control is returned to step S70. Then, distance-measuring areas continue to be set. If areamax is zero, control is returned.

The above processes complete the pre-integration and its related processes. Now that all the conditions necessary for final integration and distance-measuring calculation have been prepared, the final integration is ready to start.

Figure 7:
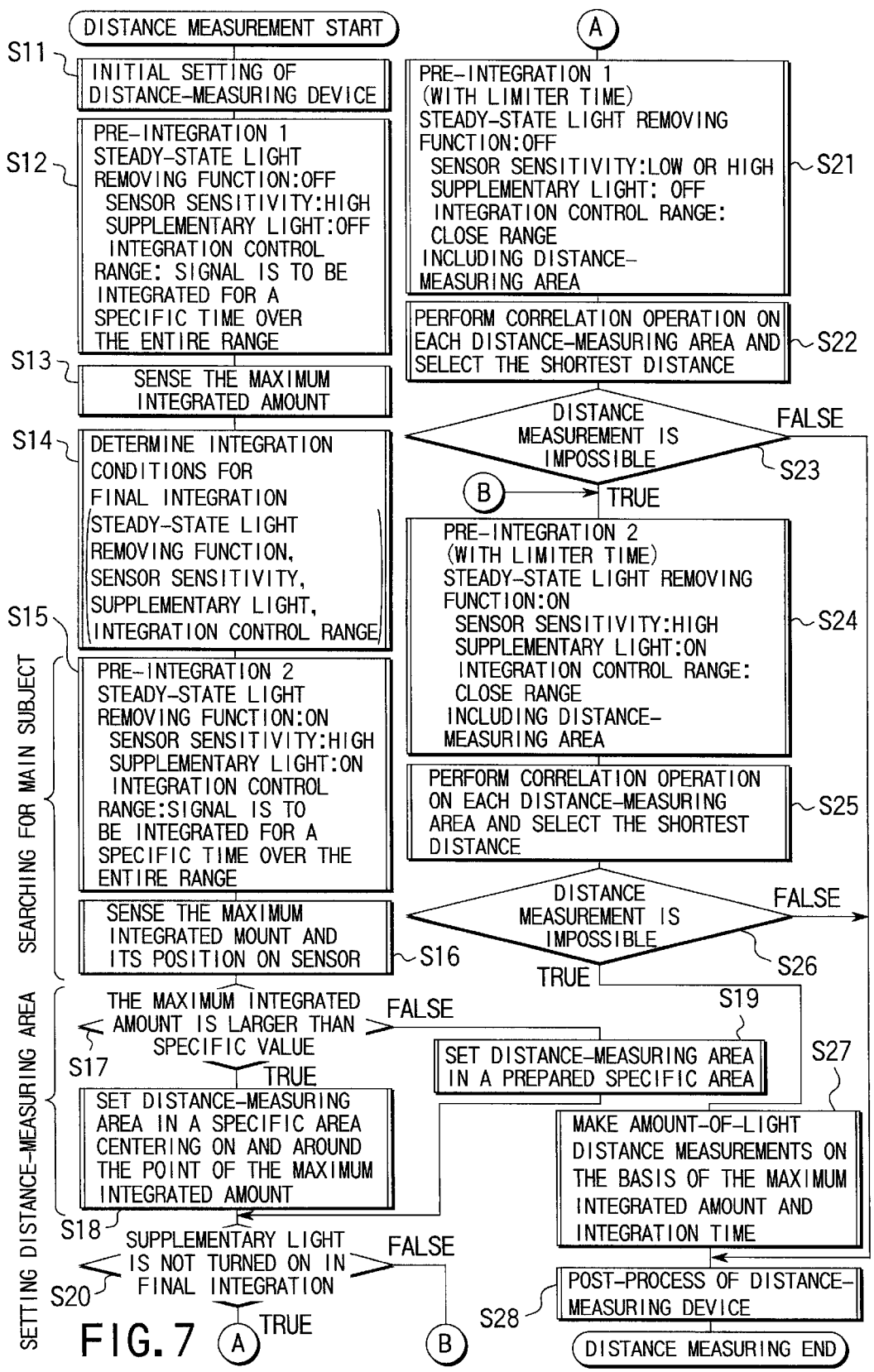
FIG. 7 is a flowchart to help explain the operation of the distance-measuring device according to the embodiment.

In the flowchart of FIG. 7, explanation will start at step S20.

Since the pre-integration at step S12 has produced the information corresponding to the luminance in the part where the subject is the brightest, a branch is implemented, depending on whether supplementary light (projecting source) is turned on the basis of the information, especially in the embodiment, whether the final integration is done in the passive mode or the active mode (step S20).

In the passive mode, control goes to step S21, whereas in the active mode, control proceeds to step S24.

At step S21, the final integration is done in the passive mode. This is executed when the subject has a relatively high luminance. The steady-state light removing function is off and the sensitivity of the sensor is set as in the pre-integration and has a low or high sensitivity.

The supplementary light (projecting source) is off and the integration control monitor signal sensing range is set as it was on the basis of the result of the pre-integration 2.

The final integration includes a time limiting function that forces the integration to end when a preset time has elapsed since the start of the integration.

Next, at step S22, a correlation operation is performed for each distance-measuring area and subject distance information is calculated for each distance-measuring area. Of the pieces of subject distance information further required, one about the shortest distance is selected. The embodiment also uses the function of judging the reliability of the subject distance information in selecting the shortest distance, and excluding, in advance, pieces of information with low reliability from the candidates to be selected (not shown). The reliability is judged by known means. The simplest judgment is judgment by contrast. There are various ways of judgment. One type of judgment or a combination of judgments is used.

In selecting the shortest distance, it is judged whether or not valid subject distance information can be selected because only less reliable subject distance information is available, that is, it is judged whether or not distance measurement is impossible (step S23). If valid subject distance information is obtained, control proceeds to step S18. If distance measurement is impossible, final integration 2 is performed in the active mode (step S24).

As described above, in the embodiment, final integration 2 in the active mode is performed only when the subject has a relatively low luminance and when actual integration 1 in the passive mode (step S21) is impossible. In this case, the steady-state light removing function is on and the sensitivity of the sensor is fixed to high sensitivity. In addition, supplementary light (projecting source 14) is on and the monitor signal sensing range is set on the basis of the result of pre-integration 2. The final integration 2 also includes the time limiter function.

Then, as in step S22, a correlation operation is performed on each distance-measuring area and thereafter, the shortest distance is selected (step S25). Such a process is roughly equal to that in step S22, so a detail explanation of it will not be given.

Next, as in step S23, it is judged whether or not distance measurement is impossible (step S26). If valid subject distance information has been obtained, control goes to step S28. If distance measurement is impossible, step S27 is executed.

At step S27, the amount of light is measured using known active AF techniques. Subject distance information is calculated on the basis of the result of actual integration 2 in the active mode at step S24, especially the maximum integrated amount. The maximum integrated amount is the amount of reflected light from the subject at the shortest distance struck by supplementary light (projecting source 14).

Post-processes, including the process of stopping the power supply to the AFIC 3 of the distance-measuring device, are executed, which completes the distance measurement (step S28).

Before a detailed explanation of amount-of-light distance measurement at step S27, the flowchart of FIG. 27, which is a simplified version of the flowchart of FIG. 7 to make the concept of the algorithm easier to understand, will be explained.

First, the initial setting of the distance-measuring device is done (step S80). Then, the luminance of the subject is judged (step S81). If the subject has a high luminance, distance measurement is made in the passive mode (step S82). Next, it is judge whether or not distance measurement is impossible (step S86).

If the subject has a low luminance at step S81, and if it has been judged at step S83 that distance measurement is impossible, distance measurement is made in the active mode (step S84).

Then, as in step S83, it is judged whether or not distance measurement is impossible (step S85). If distance measurement is impossible, control proceeds to step 87. If distance measurement is not impossible, step S86 is executed. At step S86, the shortest distance is selected. Step S82 or S84 is executed only when valid subject distance information has been obtained.

At step S87, amount-of-light distance measurement is made. Using the result of the integration in the active mode at step S84, the slope of integration dv/dt=vmax/tint(A) (or dAD/dn=Admax/n) is calculated from the integration time tint(A) (or the number of emissions of supplementary light, n) and the maximum integrated amount vmax (or the maximum A/D conversion value Admax). At the following step S88, subject distance information is calculated from the slope of the integration. Then, the post-process of the distance-measuring device is implemented at step S89.

Figure 27:
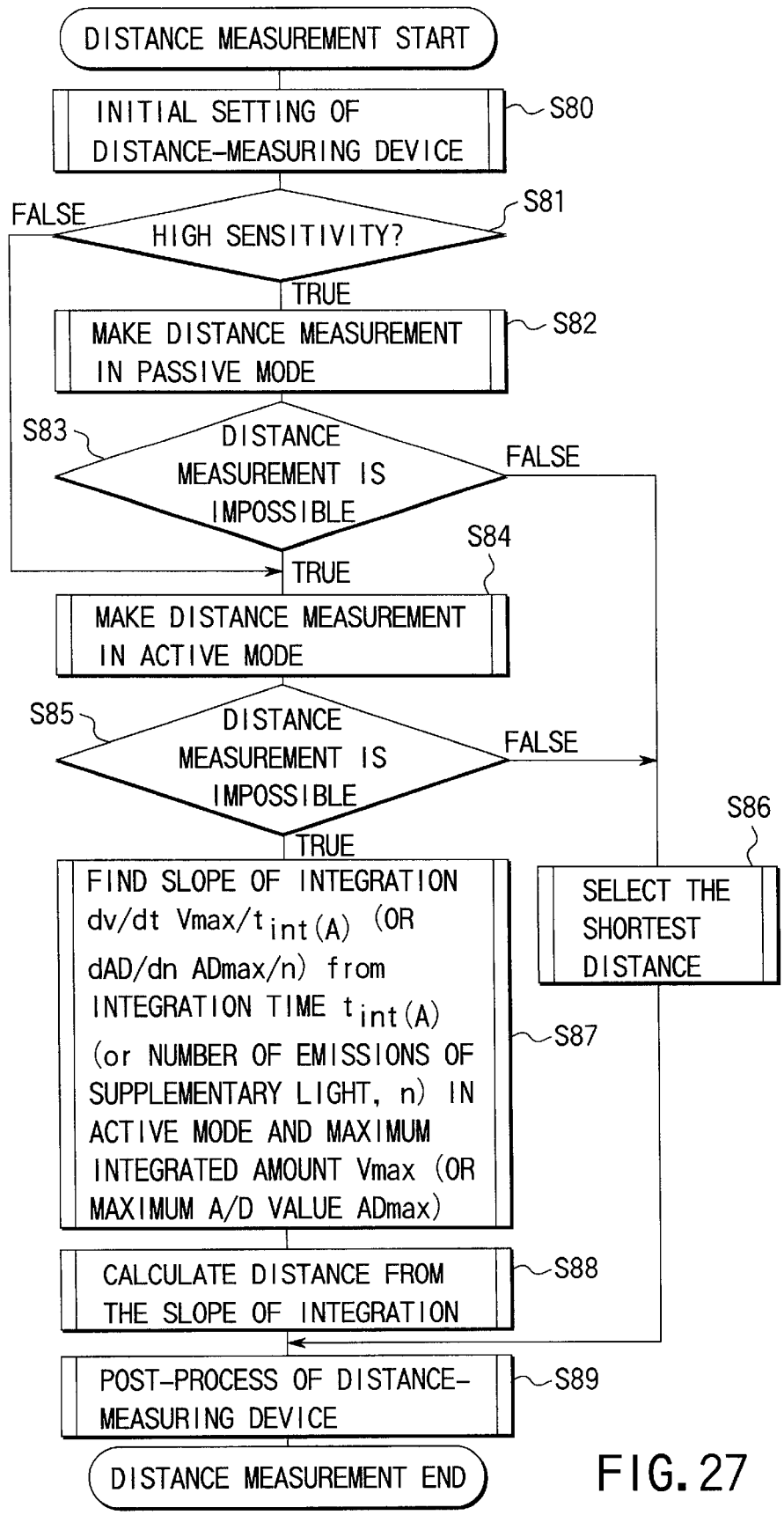
FIG. 27 is a flowchart to help give a detailed explanation of amount-of-light distance measurement in step S27 in FIG. 7.

The concept of the algorithm shown in FIG. 27 is an example of the embodiment. Although there are many variations in the concept of the algorithm, the concept where priority is given to passive, active, and the amount of light in ascending order is very important, because the active mode is executed less often, and amount-of-light distance measurement is made much less often due to the impossibility of distance measurement in both of the passive mode and active mode.

Figure 28:
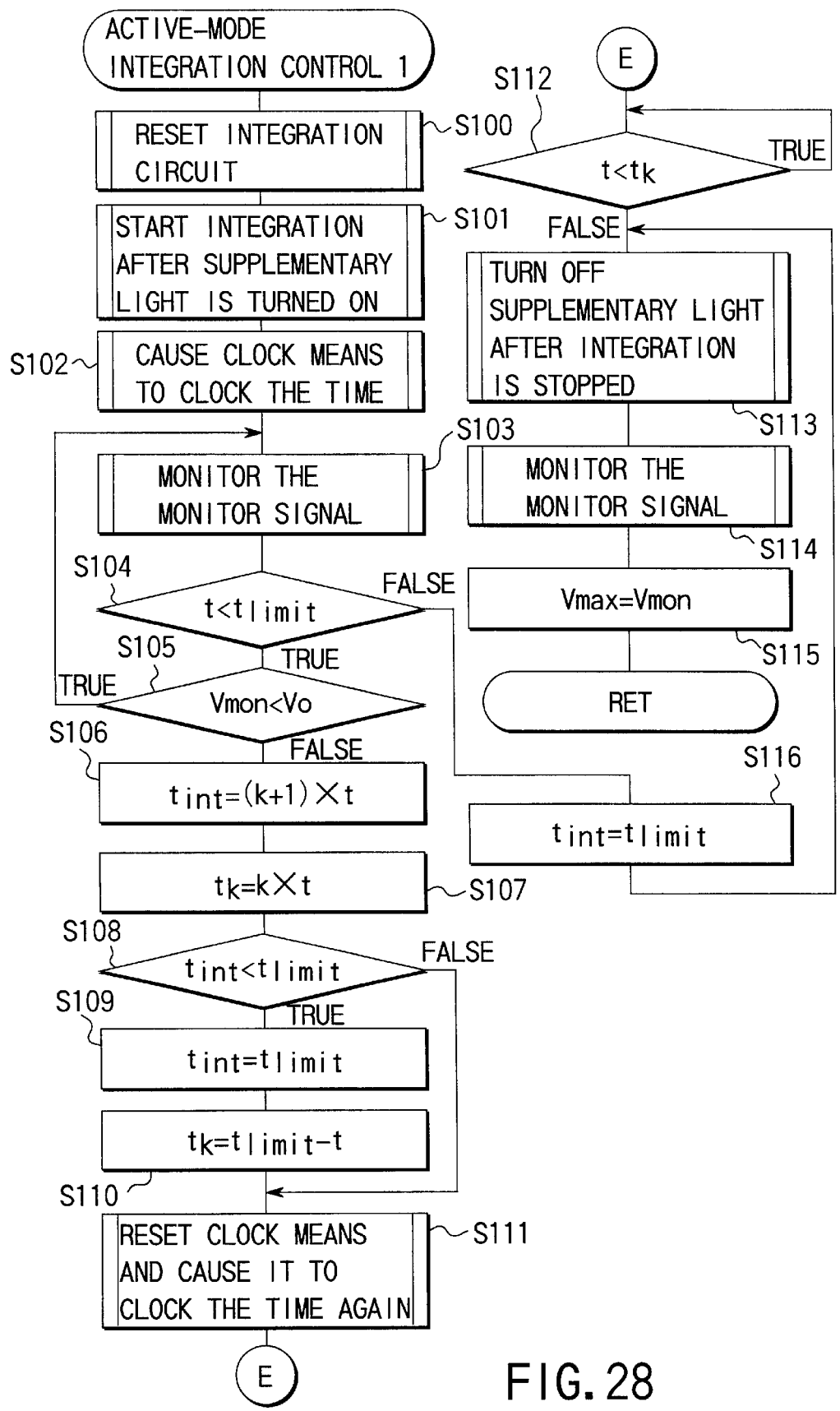
FIG. 28 is a flowchart to help explain integration control in the active mode.

Now, the explanation of amount-of-light distance measurement will be resumed by reference to the flowchart of FIG. 28.

FIG. 28 shows an example of integration control in the active mode, which is characterized by acquiring the necessary information for amount-of-light distance measurement, while controlling integration.

First, the integration circuit is reset (step S100), the supplementary light (projecting source) is turned on, and integration is started (step S101). The supplementary light is driven by direct current (D.C). Depending on the type of light source, the waiting time for the amount of light emitted to become stable is set and integration is started after the waiting time has elapsed since the turning on of the complementary light. Then, clock means starts to clock the time (step S102) and the monitor signal is monitored (step S103).

Next, it is judged whether or not the integration time has reached the integration limiter time (step S104). When the integration is forced to end at this point in time, control is returned to step S116.

If the integration time has not reached the integration limiter time at step S104, the monitor signal vmon is compared with a specific value vo (step S105). If vmon<vo, control returns to step S103, and the loop process is repeated. The specific value vo is sufficiently small as compared with half the dynamic range.

After the loop process is completed, the remaining time is estimated. That is, the full integration time is set as tint=(k+1)×t (step S106) where k is a predetermined invariable and t is the count of the clock means when control has passed through the loop process and arrives at step S106.

Then, the remaining time is set as tk=k×t (step S107) and it is judged whether or not the total integration time has exceeded the integration limiter time tlimit (step S108). If the total integration time has exceeded the integration limiter time tlimit, the total integration time is corrected to tint=tlimit (step S109) and the remaining time is corrected to tk=tlimit−t (step S110). Then, the clock means is reset and caused to start clocking the time again (step S111). The loop process is executed until the remaining integration time has elapsed (step S112). After the loop process is completed, the integration is stopped and the supplementary light is turned off (step S113).

Then, the monitor signal is monitored (step S114). The obtained monitor signal is set as vmax=vmon (step S115) and is stored.

When the integration is forced to end, the integration time is set as tint=tlimit and is stored (step S116). Then, control goes to step S113.

Explanation of steps S113, S114, and S115 is the same as what has been described above, so it will be omitted.

One example of integration control in the active mode has been explained. Another example of integration control will be described by reference to the flowchart of FIG. 29.

Explanation of FIG. 29 will be given, centering on the difference from FIG. 28.

The main part of the active-mode integration control is a method of emitting supplementary light (from the projecting source 14). In the operation of FIG. 28, the supplementary light is driven by D.C. (not shown), whereas in the operation of FIG. 29, it is driven by pulses (not shown). Specifically, the operation of FIG. 29 differs from that of FIG. 28 in that the integration time and integration limiter time are replaced with the number of emissions of the supplementary light (steps S121 to S135) and the monitor signal is not of a row voltage but is replaced with a signal quantized by an A/D converter (steps S136 to S138).

Figure 29:
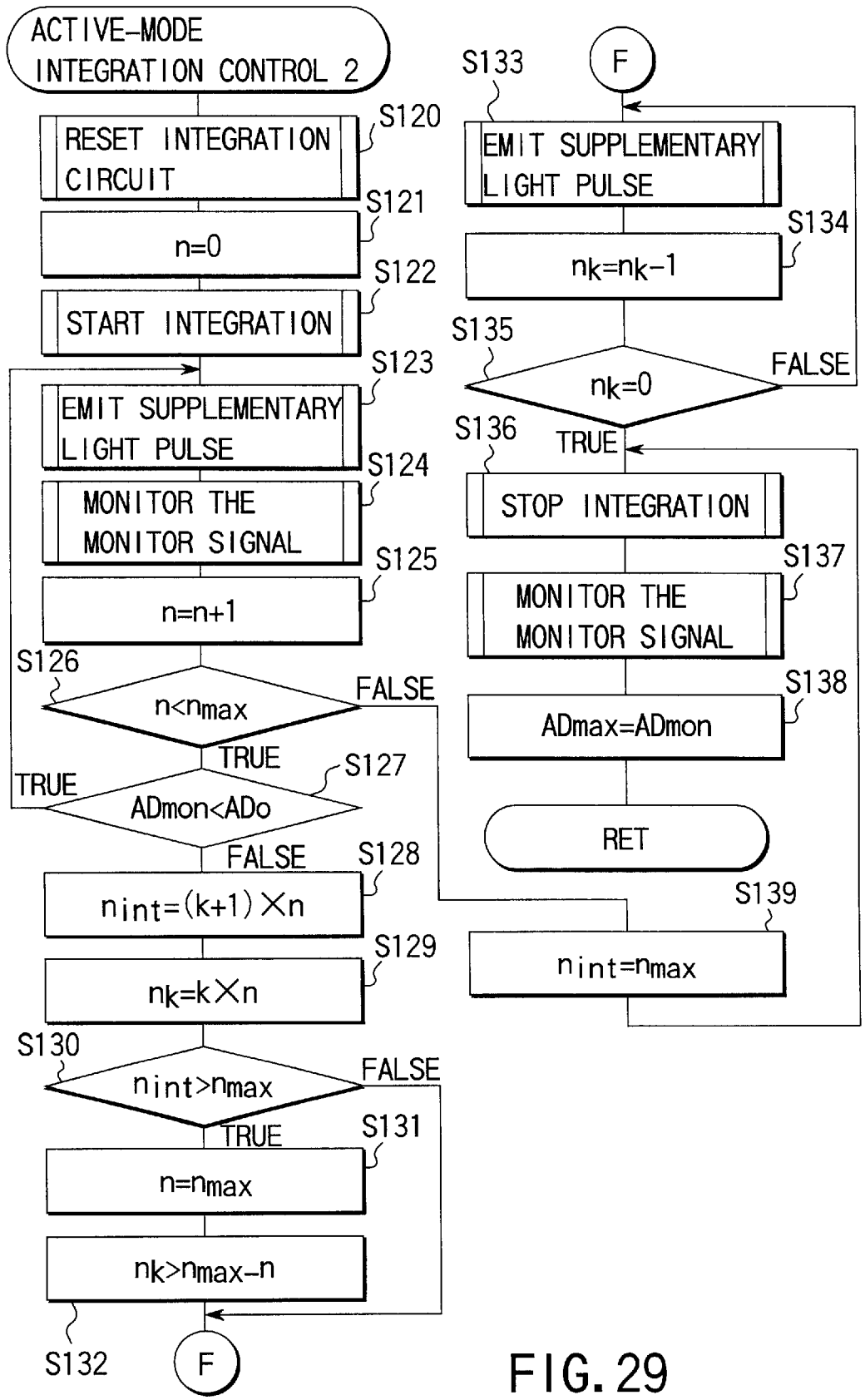
FIG. 29 is another flowchart to help explain integration control in the active mode.

From the embodiment of FIGS. 28 and 29, the integration time tint (or the number of emissions of the supplementary light, nint) and the maximum integrated amount vmax (or the AD value Admax) are obtained.

Calculating the slope of the integration from those pieces of information gives:

$$dv/dt = v\max/tint \quad (7)$$

or $$dAD/dn = AD\max/nint \quad (8)$$

The relationship between the slope of the integration and the subject distance is expressed by the following equation:

$$(\text{slope of the integration})^{1/2} \text{ (subject distance)}^{-1} \quad (9)$$

or $$(v\max/tint)^{1/2} \text{ (subject distance)}^{-1} \quad (10)$$

or $$(AD\max/nint)^{1/2} \text{ (subject distance)}^{-1} \quad (11)$$

Therefore, amount-of-light distance measurement can be made by placing a chart with a reference reflectivity at a specific distance and making adjustments to relate the slope of integration to 1/(specific distance) at the time of amount-of-light distance measurement. Amount-of-light measurement depends largely on the reflectivity of the subject and the reflectivity is a great factor that causes errors. From this point of view, how to deal with the reflectivity of the chart in adjustment is very important.

Figure 30:
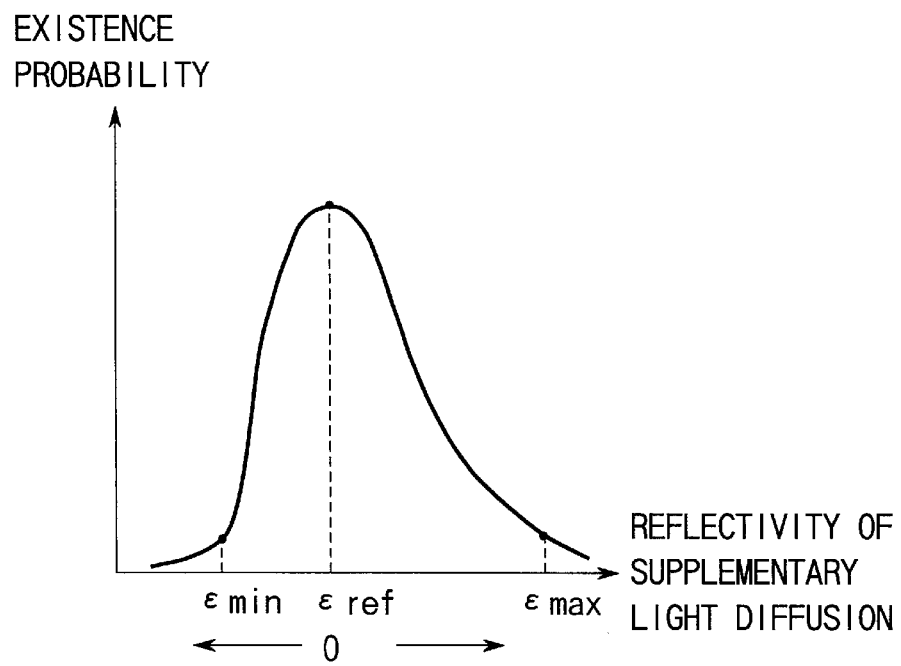
FIG. 30 shows the result of investigating the reflectivities of many objects.
Figure 31:
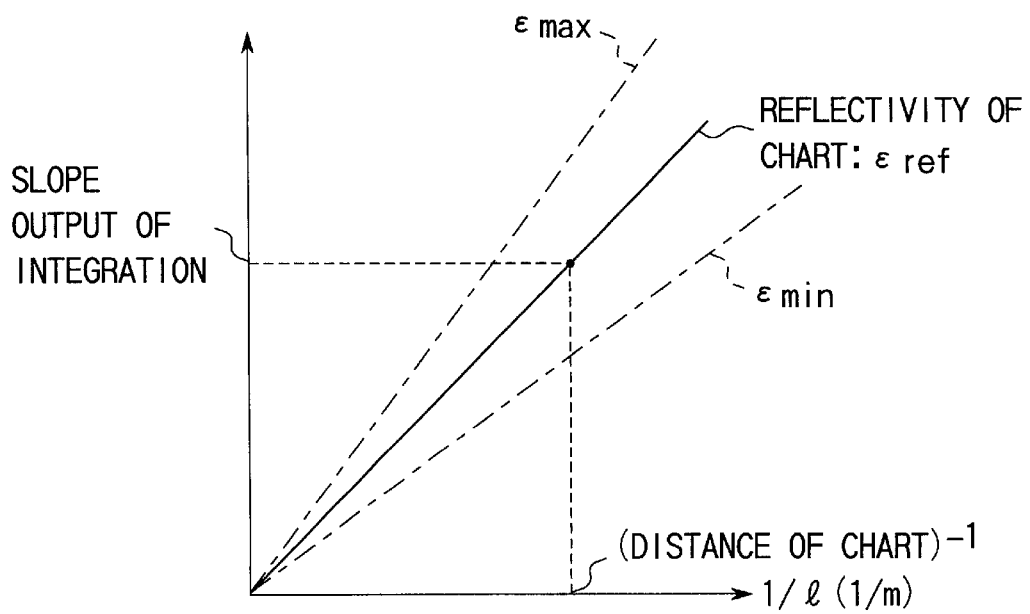
FIG. 31 is a diagram for relating the slope output of integration to 1/(specific distance), when a chart with a reference reflectivity is placed at a specific distance and amount-of-light distance measurements are made.
Figure 32:
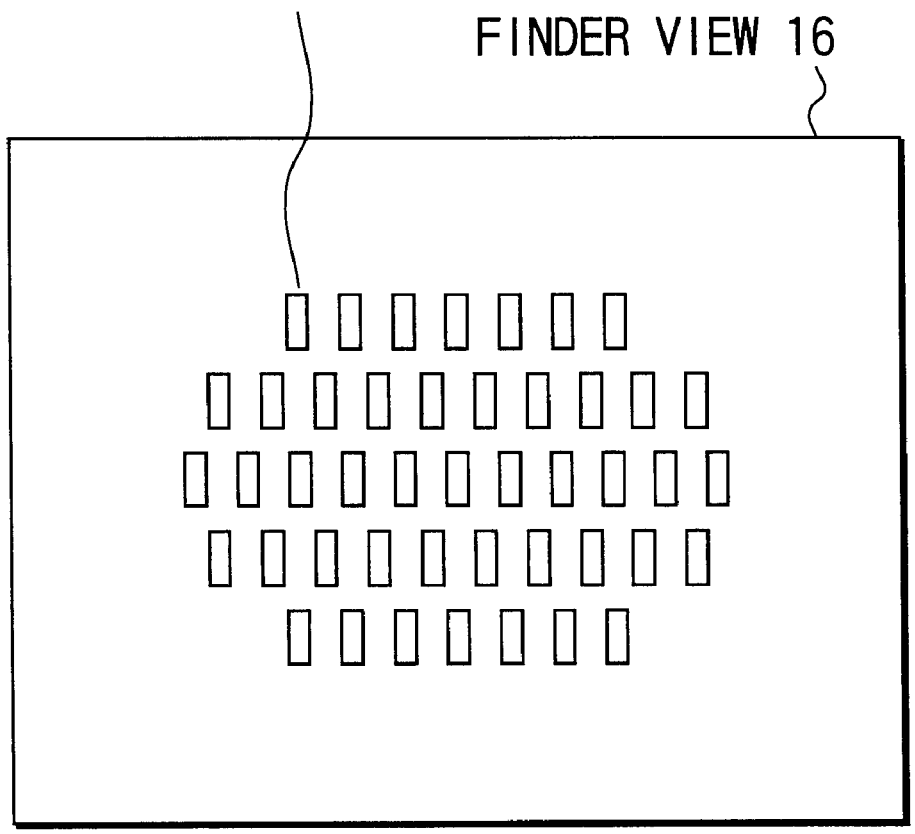
FIG. 32 shows the finder view of a conventional distance-measuring device.

The result of examining the reflectivities of many objects has revealed the distribution of existence probability for each reflectivity as shown in FIG. 30.

Generally, the reflectivity peaks at $\epsilon$ref and ranges from $\epsilon$min to $\epsilon$max. If the spread of the distribution is expressed on the scale of Ev (exposure at the image surface), it follows that $\epsilon$ref=1 Ev. Use of a chart with a reflectivity of $\epsilon$ref in adjustment is ideal.

In the explanation of amount-of-light distance measurement, the maximum integrated amount (monitor signal) has been simply used as the integrated amount used to measure the distance. In the present embodiment, maximal values of the integrated values are selected and narrowed down in setting distance-measuring areas and this does not guarantee that the maximum integrated amount (monitor signal) is included in the selected maximal values, which is inconsistent with the object of the embodiment.

In the explanation of the amount-of-light distance measurement, only the amount-of-light distance measurement has been simplified for clarity. Actually, however, the following operation (not shown) is included in the embodiment. To solve the contradiction, the integrated amount used in measuring the distance is changed and updated to the largest one of the selected maximal values, if the maximum integrated amount (monitor signal) and the address on the sensor do not coincide with any of the selected maximal values and addresses on the sensor.

Although the embodiment of the present invention has been explained, the invention is not limited to this and may be practiced or embodied in still other ways without departing from the spirit or essential character thereof. For instance, if a method of integrating photocurrent is different, the word maximal value in the explanation might be changed to the word minimal value or the light and darkness of the image signal might be reversed.

In the above embodiment, the photoelectric conversion elements are interpreted as a one-dimensional line sensor in a sense. The invention is not restricted to a line sensor and may be applied to a two-dimensional area sensor and further to an area sensor composed of line sensors distributed in a two-dimensional discrete manner. In any case, it is natural that the image signal should be broken down and processed one-dimensionally. The fundamental concept of the embodiment remains unchanged, regardless of whether the sensor is one-dimensional or two-dimensional.

As described above, with the present invention, when a wide-range multi-AF, such as a full-screen AF, is implemented, the position where the main subject is present is estimated in advance to deal with a time-lag problem and only the distances to the subjects in the necessary minimum positions are measured. The position in which the main subject is present can be estimated correctly without being affected by the reflectivity of the subject with respect to the projected light, which realizes a highly reliable, highly accurate multi-AF without an increase in cost. With the present invention, it is possible to realize not only a high-accuracy distance-measuring device and a high-accuracy distance-measuring method which enable the position of the main subject to be estimated correctly without being affected by a lustrous thing, such as glass, achieve higher-speed operation with less time-lag, and provides highly reliable results of distance measurement, but also a camera using the device and method, without increasing costs.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera comprising:

first distance-measuring means for measuring a subject distance on the basis of a subject image signal produced by a pair of integration-type light-receiving sensors receiving the light from subjects;

second distance-measuring means for measuring the subject distance on the basis of an image signal from which steady-state light removing means has removed the steady-state light component from the subject image signal, while projecting means is projecting light onto the subjects;

subject select means for causing said second distance-measuring means to operate for a specific time and, according to the image signal obtained from that operation, selecting a subject whose distance is to be measured;

mode setting means for setting the operation mode of the camera; and upper limit setting means for setting an upper limit on the number of subjects the subject select means selects according to the operation mode set by the mode setting means.

2. A distance-measuring device for a camera comprising:

a projecting device for projecting light onto subjects;

a light-receiving sensor for receiving the light from the subjects;

a distance-measuring area setting circuit which operates the projecting device and sets a distance-measuring area according to the output of the light-receiving sensor;

a mode setting circuit capable of setting more than one shooting mode; and a control circuit for controlling the number of distance-measuring areas set at the distance-measuring area setting circuit according to the shooting mode set at the mode setting circuit.

3. The distance-measuring device for a camera, according to claim 2, wherein the mode setting circuit is capable of setting a normal distance-measuring mode and a spot mode in which distance measurement is made over a narrower range than in the normal distance-measuring mode, and the control circuit performs control in such a manner that, when the mode setting circuit has set the spot mode, the number of distance-measuring areas set at the distance-measuring area setting circuit is smaller than when the mode setting circuit has set the normal distance-measuring mode.

4. The distance-measuring device for a camera, according to claim 2, wherein the mode setting circuit is capable of setting a normal distance-measuring mode and a moving-object mode suitable for shooting a moving object, and the control circuit performs control in such a manner that, when the mode setting circuit has set the moving-object mode, the number of distance-measuring areas set at the distance-measuring area setting circuit is smaller than when the mode setting circuit has set the normal distance-measuring mode.

5. The distance-measuring device for a camera, according to claim 2, wherein the mode setting circuit is capable of setting a normal distance-measuring mode and a remote-control shooting mode enabling remote control, and the control circuit performs control in such a manner that, when the mode setting circuit has set the remote-control shooting mode, the number of distance-measuring areas set at the distance-measuring area setting circuit is larger than when the mode setting circuit has set the normal distance-measuring mode.

6. The distance-measuring device for a camera, according to claim 2, wherein the mode setting circuit is capable of setting a normal distance-measuring mode and a self-timer mode, and the control circuit performs control in such a manner that, when the mode setting circuit has set the self-timer mode, the number of distance-measuring areas set at the distance-measuring area setting circuit is larger than when the mode setting circuit has set the normal distance-measuring mode.

7. The distance-measuring device for a camera, according to claim 2, wherein the mode setting circuit is capable of setting not only a normal distance-measuring mode but also a first shooting mode and a second shooting mode which are different from the normal distance-measuring mode, and the control circuit performs control in such a manner that, when the mode setting circuit has set the first shooting mode, the number of distance-measuring areas set at the distance-measuring area setting circuit is smaller than when the mode setting circuit has set the normal distance-measuring mode, whereas, when the mode setting circuit has set the second shooting mode, the number of distance-measuring areas set at the distance-measuring area setting circuit is larger than when the mode setting circuit has set the normal distance-measuring mode.

8. A distance-measuring method for a camera comprising:

a first step of measuring a subject distance on the basis of a subject image signal produced by receiving the light from subjects;

a second step of measuring the subject distance on the basis of an image signal obtained by removing the steady-state light component from the subject image signal, while projecting light onto the subjects;

a third step of causing the second step to operate for a specific time and, according to the image signal obtained from that operation, selecting a subject whose distance is to be measured;

a fourth step of setting the operation mode of the camera; and a fifth step of setting an upper limit on the number of subjects selected at the third step according to the set operation mode.

9. A distance-measuring method for a camera comprising:

a first step of projecting light onto subjects;

a second step of receiving the light from the subjects;

a third step of setting a distance-measuring area according to the output by the reception of light;

a fourth step of setting more than one shooting mode; and a fifth step of controlling the number of distance-measuring areas set at the third step according to the shooting mode set at the fourth step.

10. The distance-measuring method for a camera according to claim 9, wherein the fourth step is capable of setting a normal distance-measuring mode and a spot mode in which distance measurement is made over a narrower range than in the normal distance-measuring mode, and the fifth step performs control in such a manner that, when the spot mode has been set in the fourth step, the number of distance-measuring areas set at the third step is smaller than when the normal distance-measuring mode has been set.

11. The distance-measuring method for a camera according to claim 10, wherein the fourth step is capable of setting a normal distance-measuring mode and a moving-object mode suitable for shooting a moving object, and the fifth step performs control in such a manner that, when the moving-object mode has been set at the fourth step, the number of distance-measuring areas set at the third step is smaller than when the normal distance-measuring mode has been set.

12. The distance-measuring method for a camera according to claim 10, wherein the fourth step is capable of setting a normal distance-measuring mode and a remote-control shooting mode enabling remote control, and the fifth step performs control in such a manner that, when the remote-control shooting mode has been set in the fourth step, the number of distance-measuring areas set at the third step is larger than when the normal distance-measuring mode has been set.

13. The distance-measuring method for a camera according to claim 10, wherein the fourth step is capable of setting a normal distance-measuring mode and a self-timer mode, and the fifth step performs control in such a manner that, when the self-timer mode has been set in the fourth step, the number of distance-measuring areas set at the third step is larger than when the normal distance-measuring mode has been set.

14. The distance-measuring method for a camera according to claim 10, wherein the fourth step is capable of setting not only a normal distance-measuring mode but also a first shooting mode and a second shooting mode which are different from the normal distance-measuring mode, and the fifth step performs control in such a manner that, when the first shooting mode has been set at the fourth step, the number of distance-measuring areas set at the third step is smaller than when the normal distance-measuring mode has been set, whereas, when the second shooting mode has been set at the fourth step, the number of distance-measuring areas set at the third step is larger than when the normal distance-measuring mode has been set.

* * * * *